United States Patent
Jin et al.

(10) Patent No.: US 12,210,149 B2
(45) Date of Patent: Jan. 28, 2025

(54) IMAGE CALIBRATION METHOD AND DEVICE

(71) Applicant: HUAWEI TECHNOLOGIES CO., LTD., Shenzhen (CN)

(72) Inventors: Yunfeng Jin, Shenzhen (CN); Shuaishuai Zhu, Dongguan (CN); Yiliang Zeng, Shanghai (CN); Shuang Shan, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/257,263

(22) PCT Filed: Dec. 2, 2021

(86) PCT No.: PCT/CN2021/135168
§ 371 (c)(1),
(2) Date: Jun. 13, 2023

(87) PCT Pub. No.: WO2022/127612
PCT Pub. Date: Jun. 23, 2022

(65) Prior Publication Data
US 2024/0036306 A1 Feb. 1, 2024

(30) Foreign Application Priority Data
Dec. 14, 2020 (CN) .......................... 202011469253.5

(51) Int. Cl.
*G02B 27/00* (2006.01)
*G02B 27/01* (2006.01)

(52) U.S. Cl.
CPC ..... *G02B 27/0068* (2013.01); *G02B 27/0172* (2013.01); *G02B 27/0179* (2013.01); *G02B 2027/0138* (2013.01); *G02B 2027/0178* (2013.01); *G02B 2027/0181* (2013.01)

(58) Field of Classification Search
CPC ............ G02B 27/0068; G02B 27/0172; G02B 27/0179; G02B 2027/0138; G02B 2027/0178; G02B 2027/0181; G06F 3/013
See application file for complete search history.

(56) References Cited

U.S. PATENT DOCUMENTS

2017/0205877 A1* 7/2017 Qin .................... G02B 27/0093
2020/0051320 A1 2/2020 Laffont et al.

FOREIGN PATENT DOCUMENTS

| CN | 105955477 A | 9/2016 |
| CN | 105974582 A | 9/2016 |
| CN | 107682690 A | 2/2018 |
| CN | 109283997 A | 1/2019 |
| CN | 109891296 A | 6/2019 |

* cited by examiner

*Primary Examiner* — Lisa S Landis
(74) *Attorney, Agent, or Firm* — Leydig, Voit & Mayer, Ltd.

(57) ABSTRACT

An image calibration method and a device are provided. The method includes: obtaining a pupil position offset of a user and a visual acuity of the user, where the pupil position offset of the user is an offset of a pupil of the user relative to an optical axis; and adjusting a to-be-displayed image based on the pupil position offset of the user and the visual acuity of the user. In this way, when the user wears a head-mounted display device improperly, a point seen by the user when the user looks straight ahead is a center point of an image displayed on a display.

18 Claims, 13 Drawing Sheets

IMAGE CALIBRATION METHOD AND DEVICE

CROSS-REFERENCE TO RELATED APPLICATIONS

This application is a national stage of International Application No. PCT/CN2021/135168, filed on Dec. 2, 2021, which claims priority to Chinese Patent Application No. 202011469253.5, filed on Dec. 14, 2020. Both of the aforementioned applications are hereby incorporated by reference in their entireties.

TECHNICAL FIELD

This application relates to the field of terminal technologies, and in particular, to an image calibration method and a device.

BACKGROUND

A head-mounted display device includes one left optical system and one right optical system, and each optical system includes an optical lens and a display. After a user wears the head-mounted display device, the optical lens refracts light from the display into a human eye, so that the user can see a magnified virtual image. This enhances immersion of the user.

However, due to a mismatch of a pupillary distance of the user with a distance between two optical axes of the head-mounted display device, or improper wearing of the device by the user, or simply other reasons, points seen by the user when two eyes of the user look straight ahead are shifted at different degrees relative to center points of images displayed on displays. Consequently, the two eyes see different pictures, and the user feels dizzy.

SUMMARY

This application provides an image calibration method and a device, to calibrate an image.

According to a first aspect, this application provides an image calibration method, including: obtaining a pupil position offset of a user and a visual acuity of the user, where the pupil position offset of the user is an offset of a pupil of the user relative to an optical axis; determining, based on the pupil position offset of the user and the visual acuity of the user, a first image center point offset corresponding to the pupil position offset of the user and the visual acuity of the user; and adjusting a center point of a to-be-displayed image based on the first image center point offset and a pupil shift direction.

In a possible implementation, the determining, based on the pupil position offset of the user and the visual acuity of the user, a first image center point offset corresponding to the pupil position offset of the user and the visual acuity of the user includes: determining the first image center point offset based on the pupil position offset of the user, the visual acuity of the user, and a first mapping relationship. The first mapping relationship indicates a correspondence between a pupil position offset, a visual acuity, and an image center point offset.

In a possible implementation, the adjusting a center point of a to-be-displayed image based on the first image center point offset and a pupil shift direction includes: moving the center point of the to-be-displayed image generated by a first module toward the pupil shift direction by a first distance. The first distance is the same as the first image center point offset, and the first module is configured to render scene data according to an instruction input by the user or a default playing order, to generate a corresponding image. The first module is also referred to as a virtual camera in embodiments of this application.

In a possible implementation, the adjusting a center point of a to-be-displayed image based on the first image center point offset and a pupil shift direction includes: adjusting a displacement parameter value of a first module based on the first image center point offset, so that the center point of the to-be-displayed image generated by the first module is moved toward the pupil shift direction by a first distance. The first distance is the same as the first image center point offset, and the first module is configured to render scene data according to an instruction input by the user or a default playing order, to generate a corresponding image.

In a possible implementation, the obtaining a pupil position offset of a user includes: obtaining an eye image of the user; recognizing a pupil position from the eye image; and using a distance between the pupil position and a reference position as the pupil position offset of the user.

In a possible implementation, the obtaining a visual acuity of the user includes: obtaining a first position of each optical lens; and searching a fourth mapping relationship for a first visual acuity corresponding to the first position, and using the first visual acuity as the visual acuity of the user. The fourth mapping relationship indicates a correspondence between a position of each optical lens and a visual acuity.

In the image calibration method, when the user wears a head-mounted display device improperly, a point seen by the user when the user looks straight ahead is a center point of an image displayed on a display. In addition, after the foregoing calibration is performed on images corresponding to optical systems on both sides, pictures seen by two eyes of the user are the same, and the user does not feel dizzy.

According to a second aspect, this application provides an image calibration method, including: obtaining a pupil position offset of a user and a visual acuity of the user, where the pupil position offset of the user is an offset of a pupil of the user relative to an optical axis; determining, based on the pupil position offset of the user and the visual acuity of the user, a first distortion correction parameter corresponding to the pupil position offset of the user and the visual acuity of the user; and correcting a position of each pixel on a to-be-displayed image based on the first distortion correction parameter.

In a possible implementation, the determining, based on the pupil position offset of the user and the visual acuity of the user, a first distortion correction parameter corresponding to the pupil position offset of the user and the visual acuity of the user includes: determining the first distortion correction parameter based on the pupil position offset of the user, the visual acuity of the user, and a second mapping relationship. The second mapping relationship indicates a correspondence between a pupil position offset, a visual acuity, and a distortion correction parameter.

In a possible implementation, the first distortion correction parameter includes a distortion correction parameter corresponding to a red subpixel, a distortion correction parameter corresponding to a green subpixel, and a distortion correction parameter corresponding to a blue subpixel; and the correcting a position of each pixel on a to-be-displayed image based on the first distortion correction parameter includes: correcting a position of each red subpixel on the to-be-displayed image based on the distortion correction parameter corresponding to the red subpixel;

correcting a position of each green subpixel on the to-be-displayed image based on the distortion correction parameter corresponding to the green subpixel; and correcting a position of each blue subpixel on the to-be-displayed image based on the distortion correction parameter corresponding to the blue subpixel.

In a possible implementation, the obtaining a pupil position offset of a user includes: obtaining an eye image of the user; recognizing a pupil position from the eye image; and using a distance between the pupil position and a reference position as the pupil position offset of the user.

In a possible implementation, the obtaining a visual acuity of the user includes: obtaining a first position of each optical lens; and searching a fourth mapping relationship for a first visual acuity corresponding to the first position, and using the first visual acuity as the visual acuity of the user. The fourth mapping relationship indicates a correspondence between a position of each optical lens and a visual acuity.

In the image calibration method, because the distortion correction parameter stored in the second mapping relationship is obtained by simulating different eye offsets and different visual acuities, an effect of performing distortion correction based on the distortion correction parameter stored in the second mapping relationship is relatively ideal.

According to a third aspect, this application provides an image calibration method, including: obtaining a visual acuity of a user; determining, based on the visual acuity of the user, a first image height corresponding to the visual acuity of the user; and adjusting an image height of a to-be-displayed image based on the first image height.

In a possible implementation, the determining, based on the visual acuity of the user, a first image height corresponding to the visual acuity of the user includes: determining the first image height based on the visual acuity of the user and a third mapping relationship. The third mapping relationship indicates a correspondence between a visual acuity and an image height.

In a possible implementation, the adjusting an image height of a to-be-displayed image based on the first image height includes: adjusting the image height of the to-be-displayed image generated by a first module to be the same as the first image height. The first module is configured to render scene data according to an instruction input by the user or a default playing order, to generate a corresponding image.

In a possible implementation, the adjusting an image height of a to-be-displayed image based on the first image height includes: adjusting a field of view parameter value of a first module based on the first image height, so that the image height of the to-be-displayed image generated by the first module is the same as the first image height. The first module is configured to render scene data according to an instruction input by the user or a default playing order, to generate a corresponding image.

In a possible implementation, the obtaining a visual acuity of the user includes: obtaining a first position of each optical lens; and searching a fourth mapping relationship for a first visual acuity corresponding to the first position, and using the first visual acuity as the visual acuity of the user. The fourth mapping relationship indicates a correspondence between a position of each optical lens and a visual acuity.

In the image calibration method, users with different visual acuities can have a same field of view when using a head-mounted display device, thereby enhancing user experience.

According to a fourth aspect, this application provides an electronic device, including a camera, a lens position detector, and a processor. The camera is configured to shoot an eye image, the lens position detector is configured to detect a position of an optical lens, and the processor is configured to perform the method according to the first aspect, the second aspect, or the third aspect.

According to a fifth aspect, this application provides an electronic device, including a memory and a processor. The processor is configured to be coupled to the memory, and read and execute instructions in the memory, to implement the method according to the first aspect, the second aspect, or the third aspect.

According to a sixth aspect, this application provides a readable storage medium. The readable storage medium stores a computer program, and when the computer program is executed, the method according to the first aspect, the second aspect, or the third aspect is implemented.

According to the image calibration method and the device that are provided in this application, after the pupil position offset of the user and the visual acuity of the user are detected, a corresponding image center point offset may be found from the first mapping relationship based on the pupil position offset of the user and the visual acuity of the user, and a center point of an image to be displayed on the display may be adjusted based on the image center point offset. In this way, when the user wears the head-mounted display device improperly, a point seen by the user when the user looks straight ahead is the center point of the image displayed on the display. In addition, after the foregoing calibration is performed on images corresponding to optical systems on both sides, pictures seen by two eyes of the user are the same, and the user does not feel dizzy. In addition, a corresponding distortion correction parameter is found from the second mapping relationship based on the pupil position offset of the user and the visual acuity of the user, and based on the distortion correction parameter, distortion correction is performed on the image to be displayed on the display. Because the distortion correction parameter stored in the second mapping relationship is obtained by simulating different eye offsets and different visual acuities, an effect of performing distortion correction based on the distortion correction parameter stored in the second mapping relationship is relatively ideal. In addition, a corresponding image height is found from the third mapping relationship based on the visual acuity of the user, and an image height of the image to be displayed on the display is adjusted based on the image height. In this way, users with different visual acuities can have a same field of view when using the head-mounted display device, thereby enhancing user experience.

DESCRIPTION OF EMBODIMENTS

Figure 1:
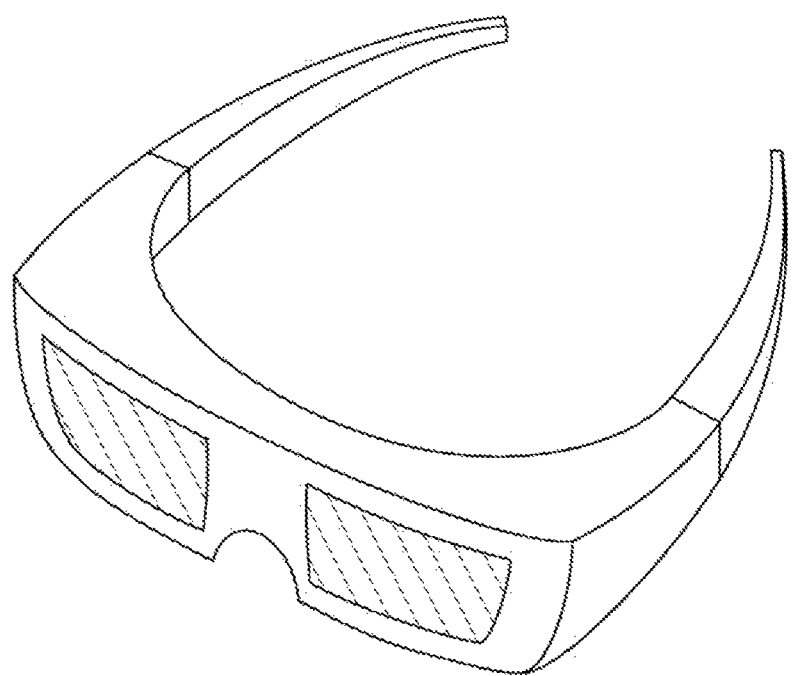
FIG. 1 is a diagram of an application scenario according to an embodiment of this application.

FIG. 1 is a diagram of an application scenario according to an embodiment of this application. FIG. 1 shows a head-mounted display device 100. The head-mounted display device 100 is a binocular display device. The head-mounted display device 100 includes left and right optical systems. An image calibration method provided in embodiments of this application is applied to a process in which the two optical systems display images. It should be noted that the head-mounted display device 100 shown in FIG. 1 is in a form of glasses, the form is merely an example, the head-mounted display device 100 may alternatively be in another form, and the another form includes but is not limited to an eye mask, a helmet, or a head-mounted display. A form of the head-mounted display device 100 is not limited in this embodiment of this application.

Figure 2:
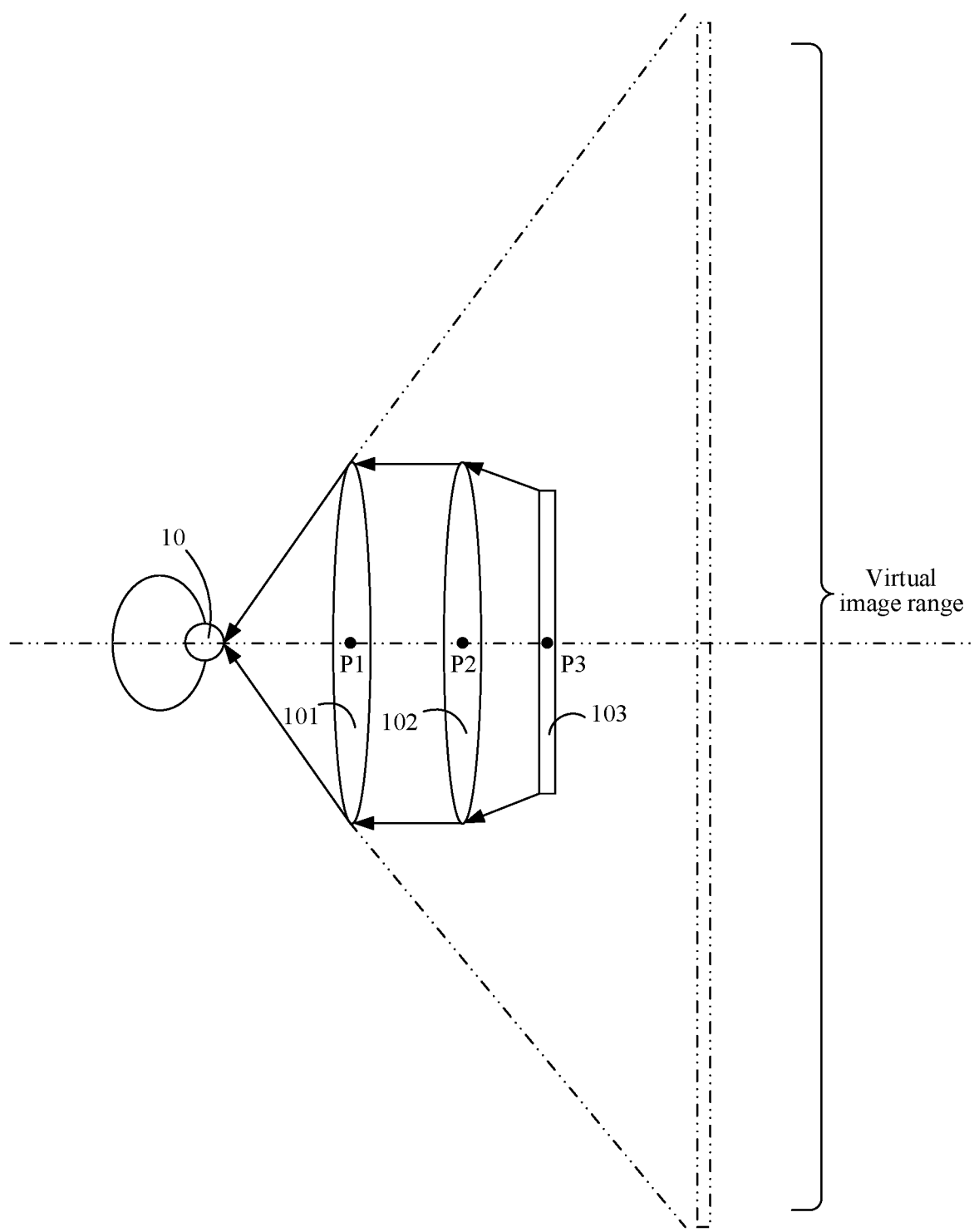
FIG. 2 is a schematic diagram of an imaging principle according to an embodiment of this application.

In some embodiments, each optical system includes two optical lenses and a display. After a user wears the head-mounted display device 100, the optical system performs imaging by using a principle shown in FIG. 2. Refer to FIG. 2. A pupil 10, an optical lens 101, an optical lens 102, and a display 103 are sequentially arranged from left to right. After the display 103 emits light, the light is refracted by the optical lens 102 and the optical lens 101 into the pupil so that the user can see a magnified virtual image. For a range of the virtual image, refer to FIG. 2. This enhances immersion of the user.

It should be noted that FIG. 2 shows an imaging principle of only one optical system in the head-mounted display device 100, and an imaging principle of the other optical system is similar. The imaging principle of the other optical system is not described in detail in this embodiment of this application.

Figure 3:
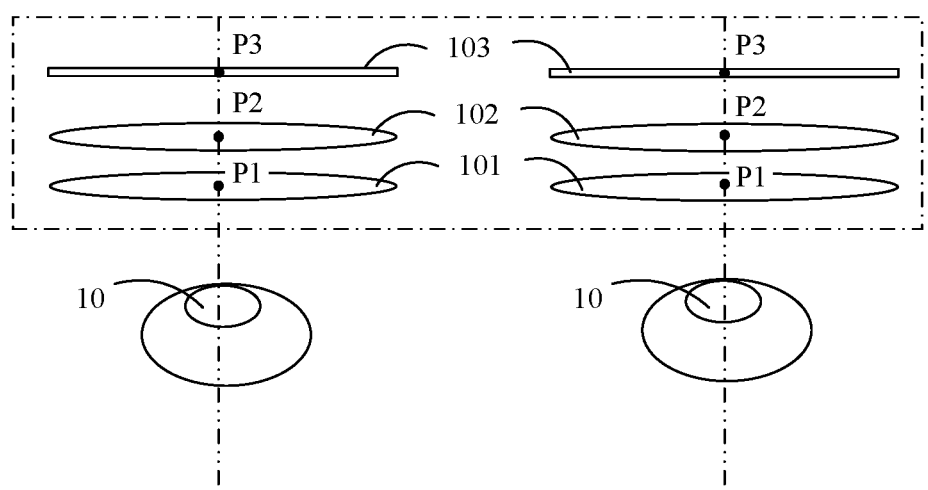
FIG. 3 is a schematic diagram of an optical axis according to an embodiment of this application.

Refer to FIG. 3. For each optical system, an optical axis of the optical system is formed by a line connecting a center point P1 of the optical lens 101, a center point P2 of the optical lens 102, and a center point P3 of the display 103. Still refer to FIG. 2. When the pupil of the user is on a corresponding optical axis, a point seen by the user when the user looks straight ahead corresponds to a center point of an image displayed on the display 103, that is, the point seen by the user when the user looks straight ahead is not shifted relative to the center point of the image displayed on the display 103. When two pupils 10 of the user are both on corresponding optical axes, pictures seen by two eyes are the same, and user experience is high.

However, due to a mismatch of a pupillary distance of the user with a distance between two optical axes of the head-mounted display device 100, or improper wearing of the device by the user, or simply other reasons, the two pupils 10 of the user may be not both on the corresponding optical axes. As a result, points seen by the user when the two eyes of the user look straight ahead are shifted at different degrees relative to center points of images displayed on displays 103. Consequently, the two eyes see different pictures, and the user feels dizzy.

According to the head-mounted display device 100 provided in this embodiment of this application, in the optical system, the optical lens 101 and the optical lens 102 at different positions correspond to different visual acuities. The visual acuity mentioned in this embodiment of this application includes but is not limited to a myopia degree or a hyperopia degree. Therefore, the user may adjust positions of the optical lens 101 and the optical lens 102 so that the positions of the two lenses match a visual acuity of the user. For example, if a myopia degree of a right eye of the user is 700 degrees, when the head-mounted display device 100 is used, the optical lens 101 and the optical lens 102 in the right optical system may be adjusted to positions corresponding to myopia of 700 degrees.

It should be noted that, if the pupil 10 of the user is not on the corresponding optical axis, when the optical lens 101 and the optical lens 102 are at different positions, a point seen by the user when the user looks straight ahead deviates at different degrees relative to the center point of the image displayed on the display 103. That is, when the pupil 10 of the user is not on the corresponding optical axis, a degree at which the point seen by the user when the user looks straight ahead deviates relative to the center point of the image displayed on the display 103 is related to the visual acuity of the user.

To resolve the foregoing problem that a user feels dizzy, this application provides an image calibration method. The method may be used in a process in which two optical systems display images. A pupil position offset of the user is detected by using a camera, and a visual acuity of the user is detected by using a lens position detector. Then, a corresponding image center point offset is found from a preconfigured mapping relationship based on the pupil position offset of the user and the visual acuity of the user. Finally, a center point of an image to be displayed on a display is adjusted based on the found image center point offset. In this way, a point seen by the user when the user looks straight ahead is not shifted relative to the center point of the image displayed on the display 103, and after the foregoing calibration is performed for the two optical systems, pictures seen by two eyes of the user are the same, and the user does not feel dizzy.

Figure 4:
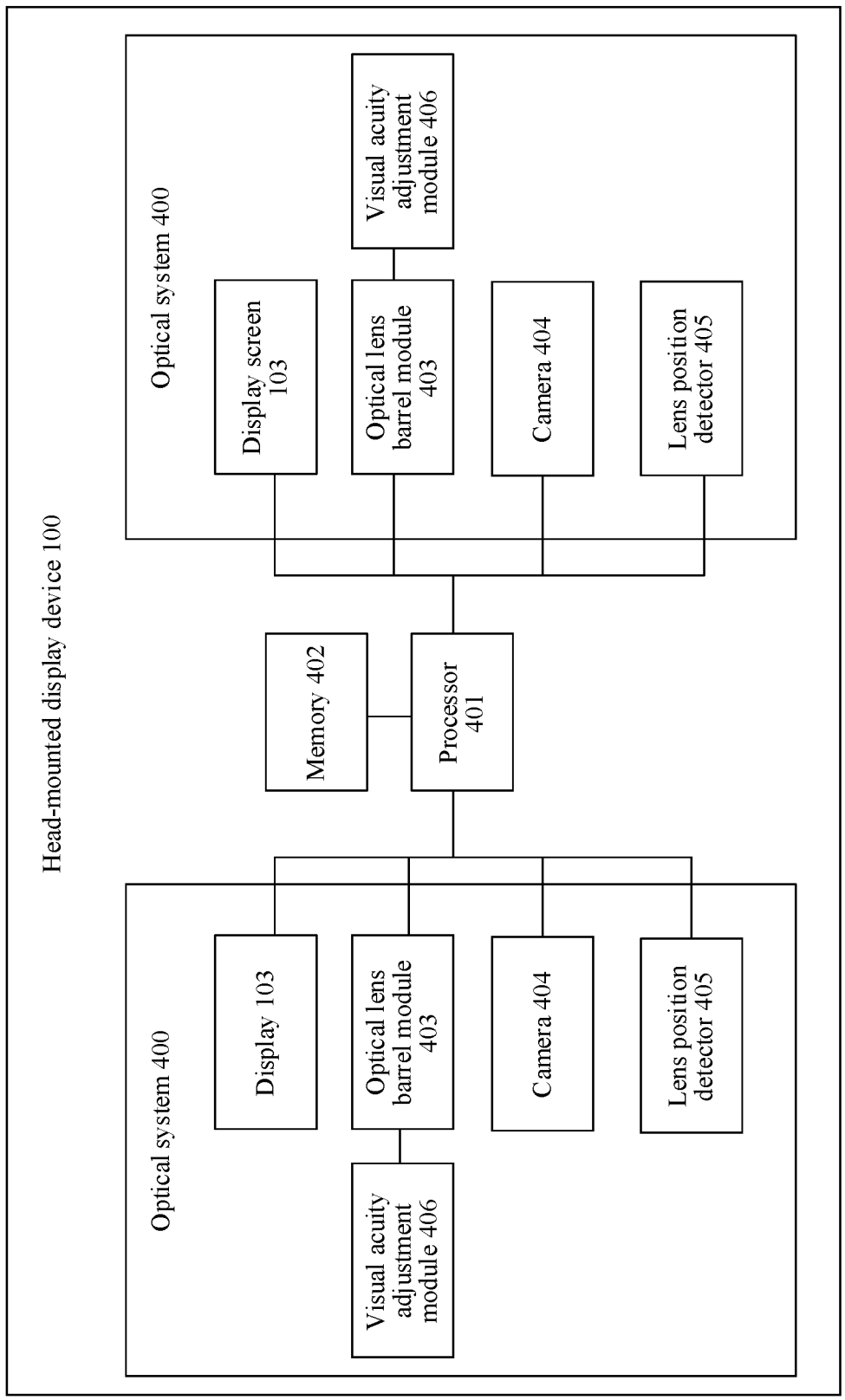
FIG. 4 is a framework diagram of a head-mounted display device 100 according to an embodiment of this application.

FIG. 4 is a framework diagram of a head-mounted display device 100 according to an embodiment of this application. The head-mounted display device 100 includes but is not limited to two optical systems 400, a processor 401, and a memory 402. Each optical system 400 includes but is not limited to a display 103, an optical lens barrel module 403, a camera 404, a lens position detector 405, and a visual acuity adjustment module 406. The optical lens barrel module 403, the display 103, the camera 404, and the lens position detector 405 in each optical system 400 are all connected to the processor 401. The memory 402 is also connected to the processor 401. The memory 402 stores a software unit related to image processing, and the software unit includes a virtual camera. The following describes functions of hardware or software units one by one.

In a possible implementation, the optical lens barrel module 403 includes an optical lens 101 and an optical lens 102 that are shown in FIG. 2. The visual acuity adjustment module 406 is configured to adjust positions of the optical lens 101 and the optical lens 102, so that the positions of the optical lens 101 and the optical lens 102 match a visual acuity of a user. It should be noted that the optical lens barrel module 403 may alternatively include one or more than two lenses. In this embodiment of this application, two lenses are used as an example to describe a calibration process in this application.

In a possible implementation, the camera 404 is configured to shoot an eye image, and send the eye image to the processor 401.

In a possible implementation, the lens position detector 405 is configured to detect a position of each optical lens in the optical lens barrel module 403, and send the position of each optical lens to the processor 401. The position, detected by the lens position detector 405, of each optical lens may be a position of each optical lens relative to the display 103.

Figure 5:
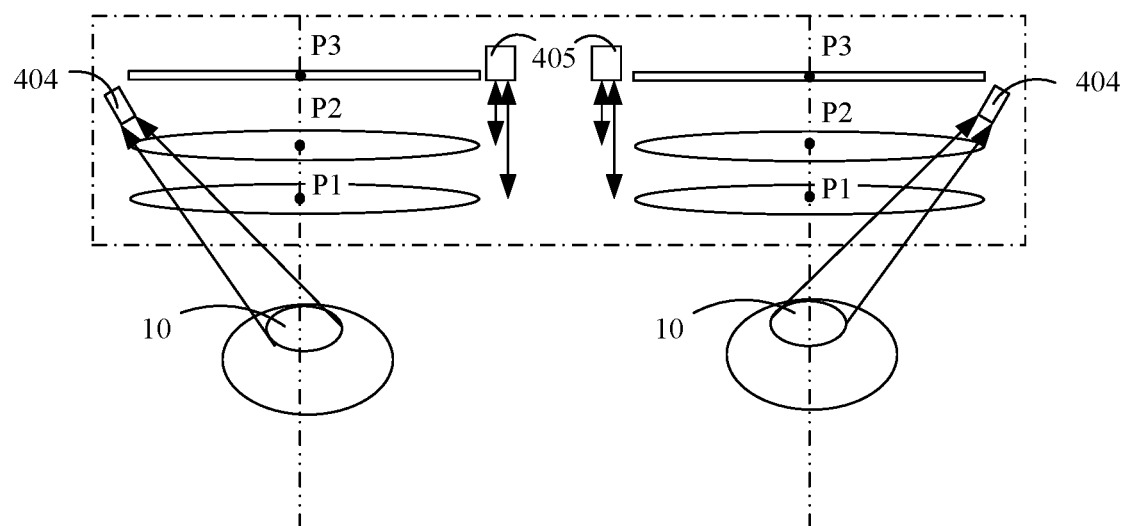
FIG. 5 is a schematic diagram of positions of a camera 404 and a lens position detector 405 according to an embodiment of this application.

In a possible implementation, positions at which the cameras 404 and the lens position detectors 405 are disposed in the two optical systems 400 may be shown in FIG. 5.

In a possible implementation, the processor 401 is configured to determine a pupil position offset of the user based on the eye image sent by the camera 404. The processor is further configured to determine the visual acuity of the user based on the position, sent by the lens position detector 405, of each optical lens.

In a possible implementation, the memory 402 further stores an application (APP). The APP may be a game APP, or may be a video APP. A type of the APP is not limited in this application. The game APP is used as an example. The game APP includes several pre-established game scenes. Each game scene has corresponding scene data, and a corresponding image may be generated by rendering the scene data. After the user opens the APP, the virtual camera renders the scene data according to an instruction input by the user, to generate a corresponding image. Alternatively, the scene data is rendered in a default playing order, to generate a corresponding image. The virtual camera may send a generated to-be-displayed image to the display 103, and the display 103 is configured to display the image sent by the virtual camera.

In a possible implementation, the virtual camera includes a displacement parameter and a field of view parameter. A center point of the image generated by the virtual camera may be adjusted by changing a displacement parameter value of the virtual camera, and an image height of the image generated by the virtual camera may be adjusted by changing a field of view parameter value of the virtual camera.

In a possible implementation, the processor 401 is further configured to adjust, based on the pupil position offset of the user and the visual acuity of the user, a center point of an image to be displayed on the display 103. The processor is further configured to determine, based on the pupil position offset of the user and the visual acuity of the user, a distortion correction parameter corresponding to the image to be displayed on the display 103, and perform, based on the distortion correction parameter, distortion correction on the image to be displayed on the display 103. The processor is further configured to adjust, based on the visual acuity of the user, an image height of the image to be displayed on the display 103. After the foregoing image calibration, a virtual image seen by the user is not affected by a pupil position shift, nor affected by the visual acuity. After the foregoing calibration is performed on the two optical systems, pictures seen by two eyes of the user are the same, which improves user experience of using the head-mounted display device 100.

In a possible implementation, the head-mounted display device 100 further includes a pupillary distance based mechanical adjustment apparatus. The pupillary distance based mechanical adjustment apparatus is configured to adjust a distance between two optical axes, so that the distance between the two optical axes matches a pupillary distance of the user. However, after the adjustment of the pupillary distance based mechanical adjustment device, if the adjustment is inappropriate or pupils of the user are shifted upward or downward relative to optical axes after the user wears the head-mounted display device 100, the two pupils 10 of the user are still not on corresponding optical axes. In this case, an image to be displayed on the display 103 may be calibrated by using the image calibration method provided in embodiments of this application.

Figure 6:
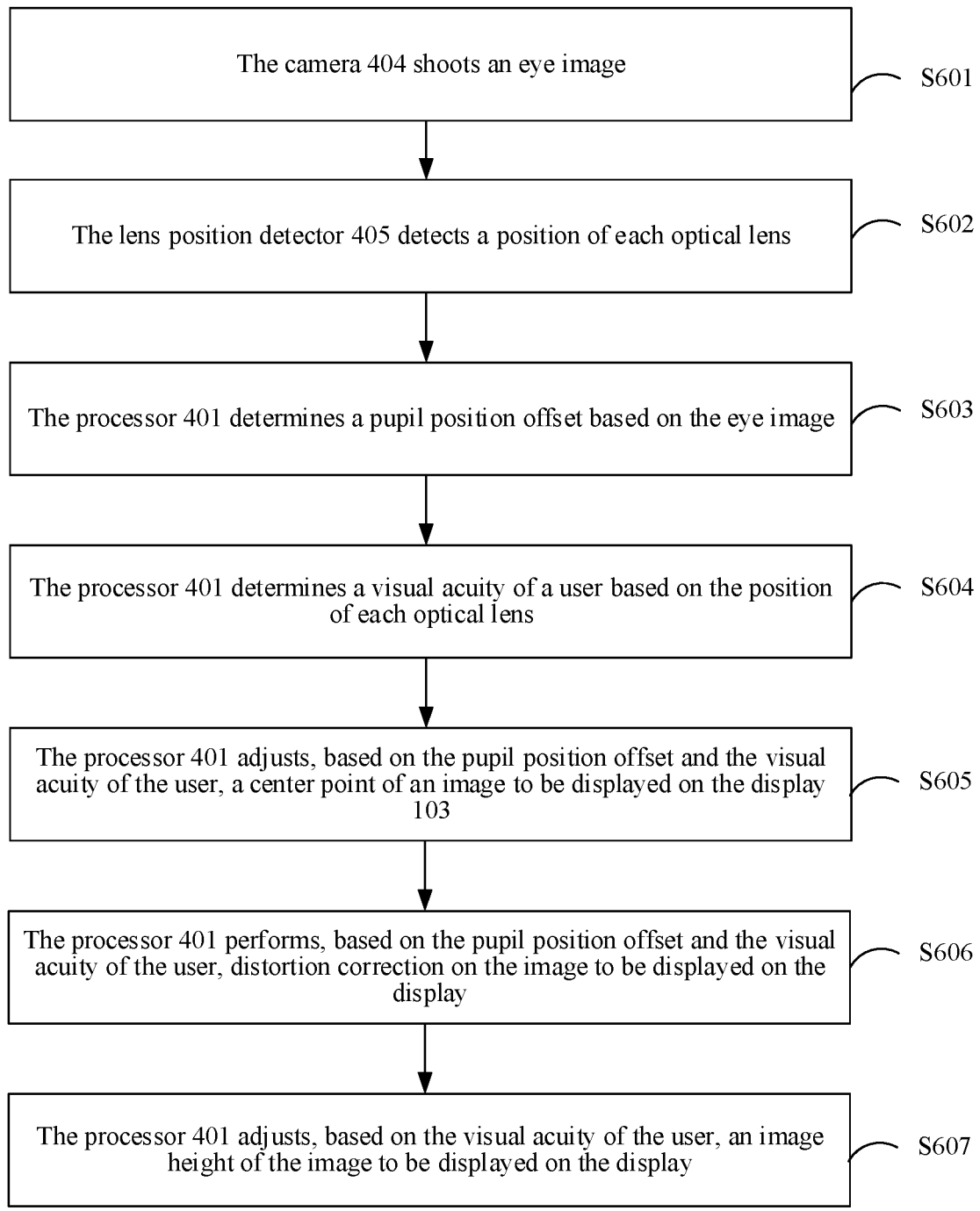
FIG. 6 is a schematic flowchart of an embodiment of an image calibration method according to this application.

FIG. 6 is a schematic flowchart of an embodiment of an image calibration method according to this application, applied to the head-mounted display device 100 shown in FIG. 4. The image calibration method provided in this embodiment may be applied after the user triggers and starts the head-mounted display device 100, or may be applied after the user triggers and starts an APP installed in the head-mounted display device 100. This is not limited in this embodiment of this application. The image calibration method provided in this embodiment specifically includes the following steps.

S601. The camera 404 shoots an eye image, and sends the eye image to the processor 401.

S602. The lens position detector 405 detects a first position of each optical lens, and sends the first position of each optical lens to the processor 401.

S603. The processor 401 determines a pupil position offset of a user based on the eye image.

Figure 7A:
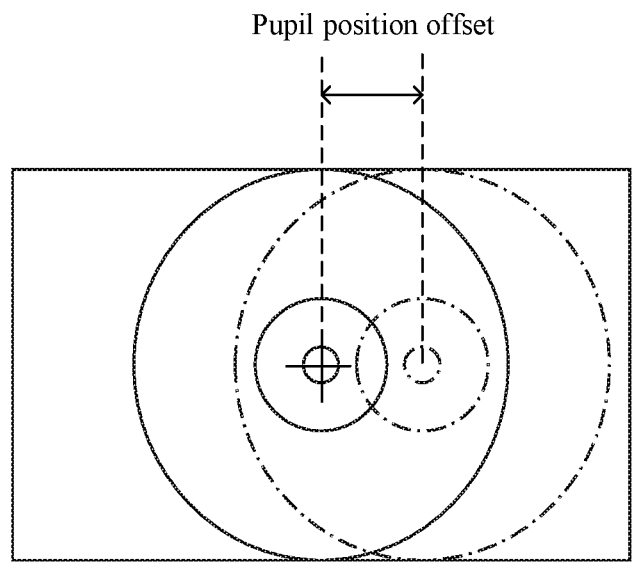
FIG. 7A is a schematic diagram of a principle of determining a pupil position offset of a user according to an embodiment of this application.

In a possible implementation, refer to FIG. 7A. After the eye image sent by the camera 404 is received, a pupil position is recognized from the eye image, and then a distance between the pupil position and a reference position is calculated as the pupil position offset of the user.

The following describes how to obtain the reference position.

Figure 7B:
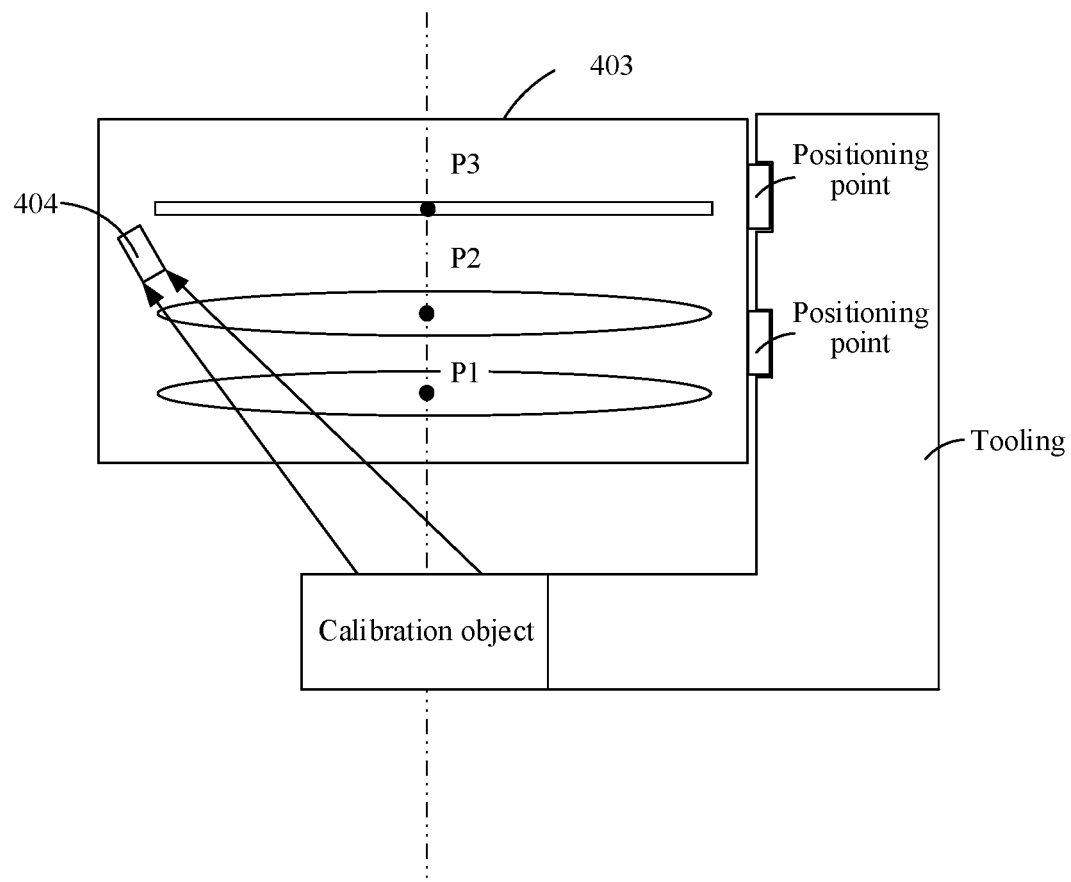
FIG. 7B is a schematic diagram of a principle of determining a reference position according to an embodiment of this application.

Refer to FIG. 7B. A positioning point is disposed on the optical lens barrel module 403, and a notch matching the positioning point is disposed on tooling. After a calibration object is installed on the tooling, the positioning point is clamped in the notch, to ensure that the calibration object is on an optical axis. The camera 404 is used to shoot an image of the calibration object, a center point of the calibration object is recognized from the image of the calibration object, and a position of the center point is used as the reference position.

S604. The processor 401 determines a visual acuity of the user based on the first position of each optical lens.

In a possible implementation, after receiving the first position, sent by the lens position detector 405, of each optical lens, the processor 401 may find, from a fourth mapping relationship, a first visual acuity corresponding to the first position, and use the found first visual acuity as the visual acuity of the user. The fourth mapping relationship is a preconfigured correspondence between a position of each optical lens and a visual acuity.

In a possible implementation, in the fourth mapping relationship, the visual acuity may include 0 degree, 100 degrees, 200 degrees, 300 degrees, 400 degrees, 500 degrees, 600 degrees, and 700 degrees, and a position, corresponding to each visual acuity, of each optical lens is shown in Table 1. A position in Table 1 is a position of the optical lens relative to the display 103. It should be noted that the correspondence shown in Table 1 is merely an example. The correspondence between a position of the optical lens 101, a position of the optical lens 102, and a visual acuity may alternatively be another relationship. Table 1 constitutes no limitation on this application.

TABLE 1

| Optical lens 101 | Optical lens 102 | Visual acuity |
|---|---|---|
| Position A1 | Position B1 | 0 degree |
| Position A2 | Position B2 | 100 degrees |
| Position A3 | Position B3 | 200 degrees |
| Position A4 | Position B4 | 300 degrees |
| Position A5 | Position B5 | 400 degrees |
| Position A6 | Position B6 | 500 degrees |
| Position A7 | Position B7 | 600 degrees |
| Position A8 | Position B8 | 700 degrees |

To enable more users with visual acuities to use the head-mounted display device 100, the visual acuity may be designed as a function of positions of the two optical lenses. After wearing the head-mounted display device 100, the user adjusts the positions of the two optical lenses, so that a visual acuity calculated by using the function matches the visual acuity of the user. In this design, the head-mounted display device 100 can be used by a user with any visual acuity.

The following uses an example for description with reference to Table 1.

Assuming that the lens position detector 405 detects that the optical lens 101 is at the position A3 and the optical lens 102 is at the position B3, the processor 401 may find, from the fourth mapping relationship, that the visual acuity of the user is 200 degrees. S605. The processor 401 adjusts, based on the pupil position offset of the user and the visual acuity of the user, a center point of an image to be displayed on the display 103.

In a possible implementation, the processor 401 finds a corresponding first image center point offset from a first mapping relationship based on the pupil position offset of the user obtained in S603 and the visual acuity of the user obtained in S604, and adjust, based on the first image center point offset and a pupil shift direction, the center point of the image to be displayed on the display. The first mapping relationship is a preconfigured correspondence between a pupil position offset, a visual acuity, and an image center point offset. The image to be displayed on the display is also referred to as a to-be-displayed image in this application.

In a possible implementation, in the first mapping relationship, the visual acuity may include 0 degree, 100 degrees, 200 degrees, 300 degrees, 400 degrees, 500 degrees, 600 degrees, and 700 degrees, and the pupil position offset may include 1 mm, 2 mm, 3 mm, and 4 mm. An image center point offset corresponding to each visual acuity and each pupil position offset is shown in Table 2. It should be noted that the correspondence shown in Table 2 is merely an example. The correspondence between a pupil position offset, a visual acuity, and an image center point offset may alternatively be another relationship. Table 2 constitutes no limitation on this application.

TABLE 2

| Visual acuity | Pupil position offset | Image center point offset |
|---|---|---|
| 0 degree | 1 mm | A1 mm |
|  | 2 mm | B1 mm |
|  | 3 mm | C1 mm |
|  | 4 mm | D1 mm |
| 100 degrees | 1 mm | A2 mm |
|  | 2 mm | B2 mm |
|  | 3 mm | C2 mm |
|  | 4 mm | D2 mm |
| 200 degrees | 1 mm | A3 mm |
|  | 2 mm | B3 mm |
|  | 3 mm | C3 mm |
|  | 4 mm | D3 mm |
| 300 degrees | 1 mm | A3 mm |
|  | 2 mm | B3 mm |
|  | 3 mm | C3 mm |
|  | 4 mm | D3 mm |
| 400 degrees | 1 mm | A4 mm |
|  | 2 mm | B4 mm |
|  | 3 mm | C4 mm |
|  | 4 mm | D4 mm |
| 500 degrees | 1 mm | A5 mm |
|  | 2 mm | B5 mm |
|  | 3 mm | C5 mm |
|  | 4 mm | D5 mm |
| 600 degrees | 1 mm | A6 mm |
|  | 2 mm | B6 mm |
|  | 3 mm | C6 mm |
|  | 4 mm | D6 mm |
| 700 degrees | 1 mm | A7 mm |
|  | 2 mm | B7 mm |
|  | 3 mm | C7 mm |
|  | 4 mm | D7 mm |

The following uses an example in which the pupil position offset is 2 mm and the visual acuity is 200 degrees to describe a process of configuring the first mapping relationship.

Figure 8:
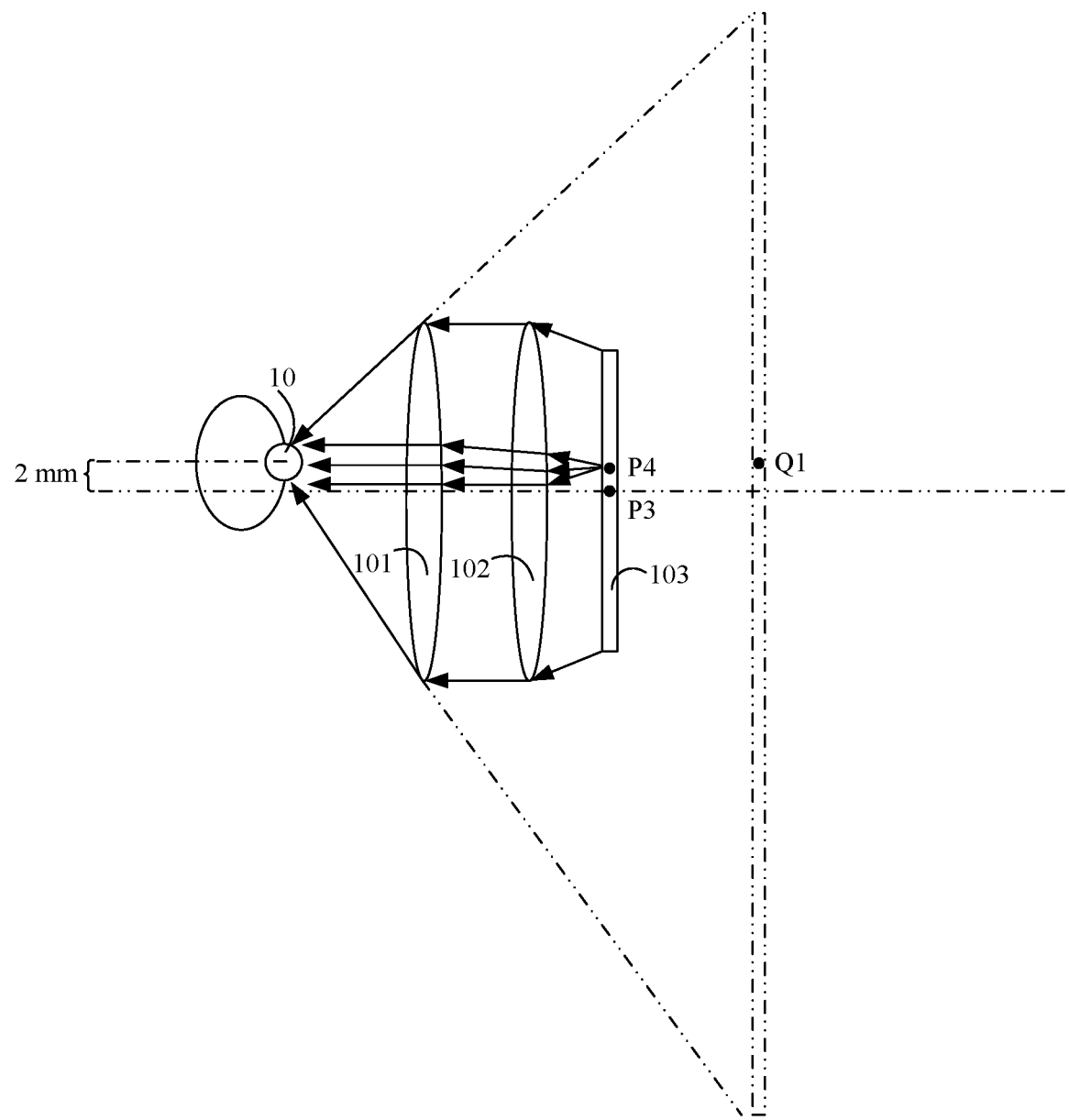
FIG. 8 is a schematic diagram of a pupil position shift according to an embodiment of this application.

Refer to FIG. 8. A simulation manner may be used to simulate that the pupil is shifted 2 mm upward relative to the optical axis, and based on the first mapping relationship shown in Table 1, the optical lens 101 and the optical lens 102 may be adjusted to positions corresponding to 200 degrees. In this case, a point Q1 seen by the user when the user looks straight ahead is not on the optical axis, a direction in which Q1 deviates from the optical axis is the same as a direction in which the pupil deviates from the optical axis, and a distance by which Q1 deviates from the optical axis is the same as a distance by which the pupil deviates from the optical axis. That is, Q1 is also shifted 2 mm upwards relative to the optical axis. Q1 does not correspond to the center point of the image displayed on the display 103, but a point obtained when the center point of the image displayed on the display 103 is shifted upward by a distance, which is represented by P4 in FIG. 8. Only when the center point of the image displayed on the display 103 is moved upward from P3 to P4, a point seen by the user when the user looks straight ahead is the center point of the image displayed on the display 103. Therefore, a distance A3 mm from P3 to P4 may be used as an image center point offset corresponding to the pupil position offset of 2 mm and the visual acuity of 200 degrees.

In a possible implementation, the processor 401 finds a corresponding first image center point offset from the first mapping relationship based on the pupil position offset of the user obtained in S603 and the visual acuity of the user obtained in S604, and then may move a center point of a to-be-displayed image generated by the virtual camera toward a pupil shift direction by a first distance. The first distance is the same as the first image center point offset.

For Example

Figure 9:
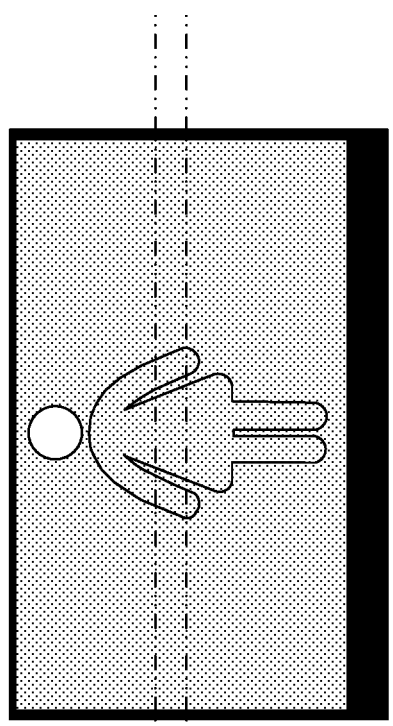
FIG. 9 is a schematic diagram of adjusting a center point of a to-be-displayed image according to an embodiment of this application.
Figure 9:
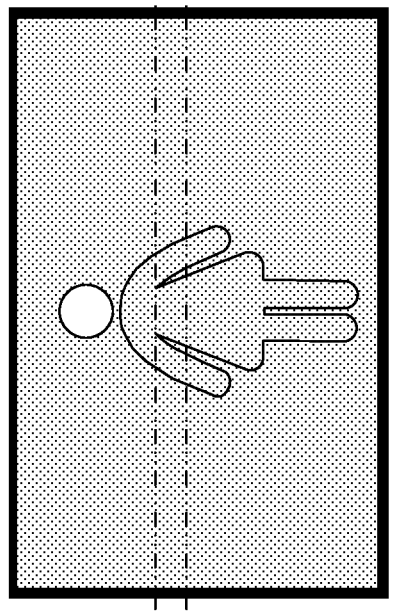

It is assumed that the pupil position offset of the user obtained in S603 is 2 mm, and the visual acuity of the user obtained in S604 is 200 degrees. It may be found from the first mapping relationship that a corresponding image center point offset is A3 mm. Refer to FIG. 9. The processor 401 may move the center point of the to-be-displayed image generated by the virtual camera toward the pupil shift direction by A3 mm, so that a point seen by the user when the user looks straight ahead is the center point of the image displayed on the display. After the foregoing calibration is performed on the optical systems on both sides, pictures seen by two eyes of the user are the same, and the user does not feel dizzy.

It should be noted that an adjustment process in this application is described in FIG. 9 by using an example in which the pupil shift direction is an upward shift. An adjustment process when the pupil is shifted in another direction is similar, and details are not described in this embodiment of this application.

In another possible implementation, the processor 401 finds a corresponding first image center point offset from the first mapping relationship based on the pupil position offset of the user obtained in S603 and the visual acuity of the user obtained in S604, and then may perform conversion based on the first image center point offset to obtain a displacement adjustment amount of the virtual camera, and adjust a displacement parameter value of the virtual camera based on the displacement adjustment amount, so that a center point of a to-be-displayed image generated by the virtual camera is moved toward a pupil shift direction by a first distance. The first distance is the same as the first image center point offset.

For Example

It is assumed that the pupil position offset of the user obtained in S603 is 2 mm, and the visual acuity of the user obtained in S604 is 200 degrees. It may be found from the first mapping relationship that a corresponding image center point offset is A3 mm. The displacement adjustment amount, obtained through conversion, of the virtual camera is a3 mm. The displacement parameter value of the virtual camera may be adjusted based on the displacement adjustment amount. After the adjustment, the center point of the image generated by the virtual camera is moved A3 mm toward the pupil shift direction, so that a point seen by the user when the user looks straight ahead is the center point of the image displayed on the display. After the foregoing calibration is performed on the optical systems on both sides, pictures seen by two eyes of the user are the same, and the user does not feel dizzy.

S606. The processor 401 performs, based on the pupil position offset of the user and the visual acuity of the user, distortion correction on the image to be displayed on the display.

In a possible implementation, the image to be displayed on the display in S606 may be an image obtained after the processor 401 performs S605.

Figure 10:
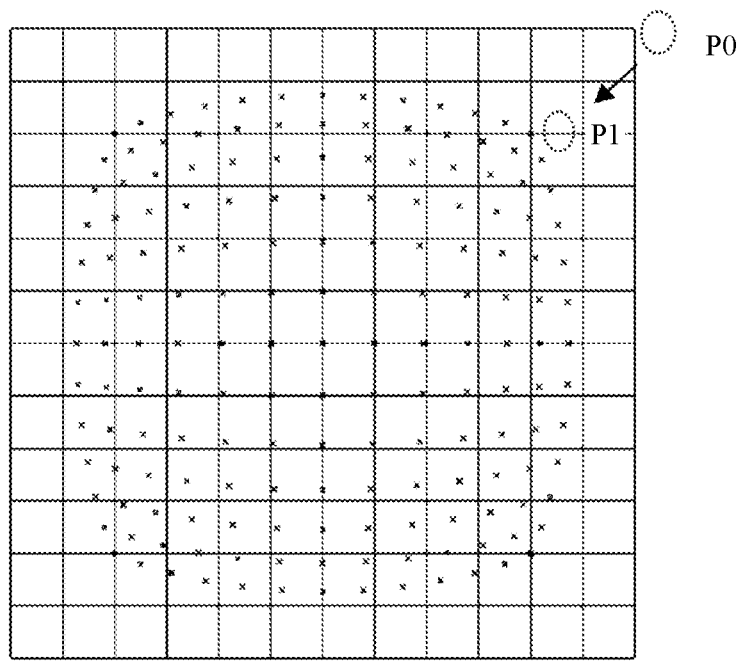
FIG. 10 is a schematic diagram of an on-axis distortion according to an embodiment of this application.
Figure 11:
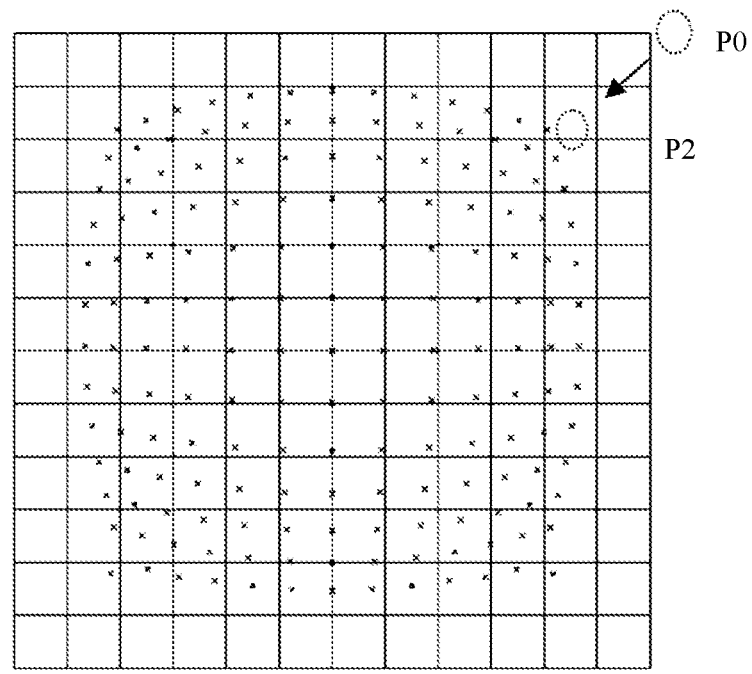
FIG. 11 is a schematic diagram of an off-axis distortion according to an embodiment of this application.

Because the optical lens 101 and the optical lens 102 have different magnifications at an edge part and a central part, an image seen by the user is distorted. FIG. 10 and FIG. 11 are schematic diagrams of two distortions of a same image that are seen by a user. FIG. 10 is a schematic diagram of an on-axis distortion. FIG. 11 is a schematic diagram of an off-axis distortion. The on-axis distortion refers to a distortion seen by the user when the pupil is not shifted relative to the optical axis. The off-axis distortion refers to a distortion seen by the user when the pupil is shifted relative to the optical axis. FIG. 11 illustrates a distortion seen when the pupil is shifted upward relative to the optical axis. In FIG. 10 and FIG. 11, a grid intersection point represents a position of a pixel when no distortion occurs, and a cross-shaped point represents a position of a pixel after an image is distorted. It can be learned by comparison that an image distortion status seen by the user when the pupil is not shifted is different from an image distortion status seen by the user when the pupil is shifted. For example, when the pupil is not shifted, a pixel at P0 is moved to P1 in FIG. 10 after a distortion, as shown by an arrow in FIG. 10. When the pupil is shifted, the pixel at P0 is moved to P2 in FIG. 11 after a distortion, as shown by an arrow in FIG. 11. A position shown by P1 in FIG. 10 is obviously different from a position shown by P2 in FIG. 11.

Figure 12:
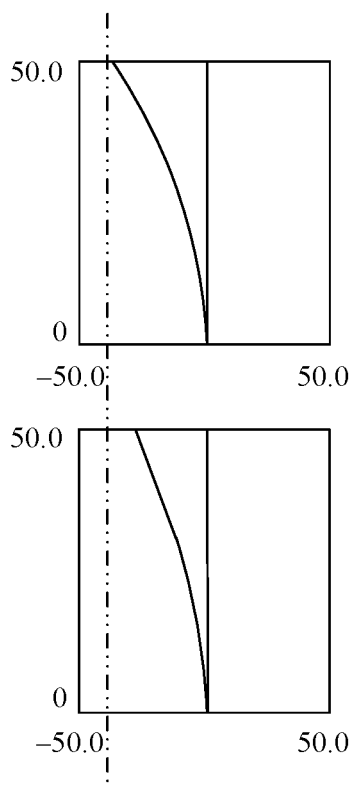
FIG. 12 is a schematic diagram of an image distortion degree changing with a field of view according to an embodiment of this application.

In addition, refer to FIG. 12. In upper and lower figures, a horizontal coordinate represents a distortion degree, and a vertical coordinate represents a field of view. The upper figure shows an image distortion degree changing with a field of view when a visual acuity is 700 degrees. The lower figure shows an image distortion degree changing with a field of view when a visual acuity is 0 degree. It can be learned by comparison that users with different visual acuities see different image distortion degrees, that is, the image distortion degree is related to the visual acuity.

In a possible implementation, the processor 401 finds a corresponding first distortion correction parameter from a second mapping relationship based on the pupil position offset of the user obtained in S603 and the visual acuity of the user obtained in S604. For each pixel of the to-be-displayed image, the first distortion correction parameter and coordinates of the pixel may be substituted into a distortion correction formula, to obtain coordinates of the pixel after distortion correction. The second mapping relationship is a preconfigured correspondence between a pupil position offset, a visual acuity, and a distortion correction parameter.

For Example

It is assumed that the distortion correction formula is $R'=a*R+b*R^3+c*R^5+d*R^7+e*R^9$, where a, b, c, d, and e represent the first distortion correction parameter found from the second mapping relationship, R represents a distance between a pixel before distortion correction and the center point of the image, R may be calculated based on coordinates of the pixel before distortion correction and coordinates of the center point of the image, and R' represents a distance between a pixel after distortion correction and the center point of the image. For each pixel on the to-be-displayed image, R' is obtained, and the pixel is moved along a connection line between the pixel before distortion correction and the center point of the image to a position corresponding to R', to complete distortion correction of the pixel.

In a possible implementation, the distortion correction formula may alternatively be a polynomial formula used in the following polynomial fitting process.

In a possible implementation, in the second mapping relationship, the visual acuity may include 0 degree, 100 degrees, 200 degrees, 300 degrees, 400 degrees, 500 degrees, 600 degrees, and 700 degrees, and the pupil position offset may include 1 mm, 2 mm, 3 mm, and 4 mm. For a distortion correction parameter corresponding to each visual acuity and each pupil position offset, refer to Table 3. It should be noted that the correspondence shown in Table 3 is merely an example. The correspondence between a pupil position offset, a visual acuity, and a distortion correction parameter may alternatively be another relationship. In addition, the distortion correction parameter may alternatively include a plurality of values. Table 3 constitutes no limitation on this application.

TABLE 3

| Visual acuity | Eye offset | Distortion correction parameter |
|---|---|---|
| 0 degree | 1 mm | A1 |
| | 2 mm | B1 |
| | 3 mm | C1 |
| | 4 mm | D1 |
| 100 degrees | 1 mm | A2 |
| | 2 mm | B2 |
| | 3 mm | C2 |
| | 4 mm | D2 |
| 200 degrees | 1 mm | A3 |
| | 2 mm | B3 |
| | 3 mm | C3 |
| | 4 mm | D3 |
| 300 degrees | 1 mm | A4 |
| | 2 mm | B4 |
| | 3 mm | C4 |
| | 4 mm | D4 |
| 400 degrees | 1 mm | A5 |
| | 2 mm | B5 |
| | 3 mm | C5 |
| | 4 mm | D5 |
| 500 degrees | 1 mm | A6 |
| | 2 mm | B6 |
| | 3 mm | C6 |
| | 4 mm | D6 |
| 600 degrees | 1 mm | A7 |
| | 2 mm | B7 |
| | 3 mm | C7 |
| | 4 mm | D7 |
| 700 degrees | 1 mm | A8 |
| | 2 mm | B8 |
| | 3 mm | C8 |
| | 4 mm | D8 |

The following uses an example in which the pupil position offset is 2 mm and the visual acuity is 200 degrees to describe a process of configuring the second mapping relationship.

A simulation manner may be used to simulate that the eye position is shifted 2 mm upward relative to the optical axis, and based on the first mapping relationship shown in Table 1, the optical lens 101 and the optical lens 102 may be adjusted to positions corresponding to 200 degrees. In this case, it is assumed that an image distortion status seen by the user is shown in FIG. 11. A position of each pixel when no distortion occurs and a position of each pixel after the image is distorted are obtained from FIG. 11. Then, the two are fit in a polynomial fitting manner. A fitting result is a distortion correction parameter corresponding to the image distortion status shown in FIG. 11. The distortion correction parameter may be used as a distortion correction parameter corresponding to the pupil position offset of 2 mm and the visual acuity of 200 degrees, and stored in the second mapping relationship. Because the distortion correction parameter stored in the second mapping relationship is obtained by simulating different eye offsets and different visual acuities, an effect of performing distortion correction based on the distortion correction parameter stored in the second mapping relationship is relatively ideal.

Each pixel on the image includes red, blue, and green subpixels. After the image is distorted, the three subpixels are moved to different positions, resulting in color separation of the image displayed on the display. Therefore, the foregoing distortion correction may be separately performed on the red subpixel, the blue subpixel, and the green subpixel, to resolve the color separation problem.

In a possible implementation, when the second mapping relationship is configured, a correspondence between a pupil position offset, a visual acuity, and a distortion correction parameter corresponding to a subpixel of each color may be configured. In the second mapping relationship, the visual acuity may include 0 degree, 100 degrees, 200 degrees, 300 degrees, 400 degrees, 500 degrees, 600 degrees, and 700 degrees, the pupil position offset may include 1 mm, 2 mm, 3 mm, and 4 mm, and the distortion correction parameter may include a distortion correction parameter corresponding to the red subpixel, a distortion correction parameter corresponding to the blue subpixel, and a distortion correction parameter corresponding to the green subpixel, as shown in Table 4. The correspondence shown in Table 4 is merely an example. The correspondence between a pupil position offset, a visual acuity, and a distortion correction parameter of each color may alternatively be another relationship. Table 4 constitutes no limitation on this application.

TABLE 4

| Visual acuity | Eye offset | Distortion correction parameter corresponding to red subpixel | Distortion correction parameter corresponding to blue subpixel | Distortion correction parameter corresponding to green subpixel |
|---|---|---|---|---|
| 0 degree | 1 mm | A1 | E1 | M1 |
| | 2 mm | B1 | F1 | N1 |
| | 3 mm | C1 | G1 | P1 |
| | 4 mm | D1 | H1 | Q1 |
| 100 degrees | 1 mm | A2 | E2 | M2 |
| | 2 mm | B2 | F2 | N2 |
| | 3 mm | C2 | G2 | P2 |
| | 4 mm | D2 | H2 | Q2 |
| 200 degrees | 1 mm | A3 | E3 | M3 |
| | 2 mm | B3 | F3 | N3 |
| | 3 mm | C3 | G3 | P3 |
| | 4 mm | D3 | H3 | Q3 |
| 300 degrees | 1 mm | A4 | E4 | M4 |
| | 2 mm | B4 | F4 | N4 |
| | 3 mm | C4 | G4 | P4 |
| | 4 mm | D4 | H4 | Q4 |
| 400 degrees | 1 mm | A5 | E5 | M5 |
| | 2 mm | B5 | F5 | N5 |
| | 3 mm | C5 | G5 | P5 |
| | 4 mm | D5 | H5 | Q5 |
| 500 degrees | 1 mm | A6 | E6 | M6 |
| | 2 mm | B6 | F6 | N6 |
| | 3 mm | C6 | G6 | P6 |
| | 4 mm | D6 | H6 | Q6 |
| 600 degrees | 1 mm | A7 | E7 | M7 |
| | 2 mm | B7 | F7 | N7 |
| | 3 mm | C7 | G7 | P7 |
| | 4 mm | D7 | H7 | Q7 |
| 700 degrees | 1 mm | A8 | E8 | M8 |
| | 2 mm | B8 | F8 | N8 |
| | 3 mm | C8 | G8 | P8 |
| | 4 mm | D8 | H8 | Q8 |

In a possible implementation, the processor 401 finds, based on the pupil position offset of the user obtained in S603 and the visual acuity of the user obtained in S604, a corresponding distortion correction parameter corresponding to the red subpixel, a corresponding distortion correction parameter corresponding to the blue subpixel, and a corresponding distortion correction parameter corresponding to the green subpixel from the second mapping relationship shown in Table 4. For each red subpixel on the to-be-displayed image, the processor substitutes the distortion correction parameter corresponding to the red subpixel and coordinates of the red subpixel into the distortion correction formula, to obtain coordinates of the red subpixel after distortion correction. For each green subpixel on the to-be-displayed image, the processor substitutes the distortion correction parameter corresponding to the green subpixel and coordinates of the green subpixel into the distortion correction formula, to obtain coordinates of the green subpixel after distortion correction. For each blue subpixel on the to-be-displayed image, the processor substitutes the distortion correction parameter corresponding to the blue subpixel and coordinates of the blue subpixel into the distortion correction formula, to obtain coordinates of the blue subpixel after distortion correction. For a process of performing distortion correction on the subpixel of each color, refer to the foregoing description.

S607. The processor 401 adjusts, based on the visual acuity of the user, an image height of the image to be displayed on the display.

Figure 13:
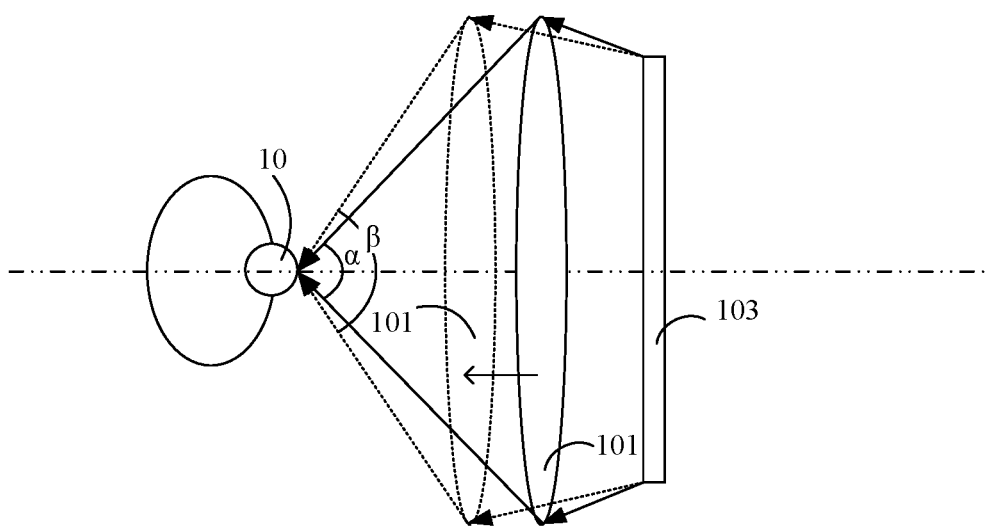
FIG. 13 is a schematic diagram of fields of view corresponding to different visual acuities according to an embodiment of this application.

Refer to FIG. 13. For example, the optical lens barrel module 403 includes only one optical lens 101. When the optical lens 101 is at a solid line position, a corresponding field of view (FOV) is α. When the optical lens 101 is moved to a dotted line position, a corresponding field of view is β. Because a position of the optical lens changes a visual acuity, a field of view of the user is related to the visual acuity of the user. To enable users with different visual acuities to have a same field of view when using the head-mounted display device 100, the processor 401 may adjust, based on the visual acuities of the users, the image height of the image to be displayed on the display.

In a possible implementation, the processor 401 finds a corresponding first image height from a third mapping relationship based on the visual acuity of the user obtained in S604, and adjusts, based on the first image height, the image height of the image to be displayed on the display. The third mapping relationship is a preconfigured correspondence between a visual acuity and an image height.

In a possible implementation, in the third mapping relationship, the visual acuity may include 0 degree, 100 degrees, 200 degrees, 300 degrees, 400 degrees, 500 degrees, 600 degrees, and 700 degrees, and an image height corresponding to each visual acuity is shown in Table 5. It should be noted that the correspondence shown in Table 5 is merely an example. The correspondence between a visual acuity and an image height may alternatively be another relationship. Table 5 constitutes no limitation on this application.

TABLE 5

| Visual acuity | Image height |
| --- | --- |
| 0 degree | H1 mm |
| 100 degrees | H2 mm |
| 200 degrees | H3 mm |
| 300 degrees | H4 mm |

TABLE 5-continued

| Visual acuity | Image height |
| --- | --- |
| 400 degrees | H5 mm |
| 500 degrees | H6 mm |
| 600 degrees | H7 mm |
| 700 degrees | H8 mm |

The following uses an example in which the visual acuity is 200 degrees to describe a process of configuring the third mapping relationship.

Figure 14:
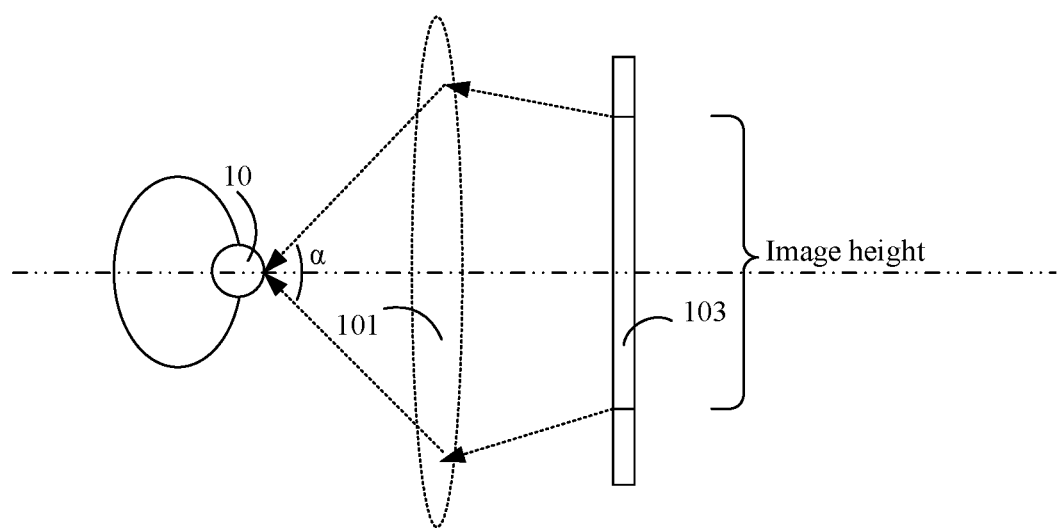
FIG. 14 is a schematic diagram 1 of adjusting an image height of a to-be-displayed image according to an embodiment of this application.

In FIG. 13, it is assumed that a corresponding visual acuity when the optical lens 101 is at the solid line position is 0 degree, a corresponding visual acuity when the optical lens 101 is moved to the dotted line position is 200 degrees, a field of view of a user whose visual acuity is 0 degree is α, and a field of view of a user whose visual acuity is 200 degrees is β. To enable the user whose visual acuity is 200 degrees and the user whose visual acuity is 0 degree to have a same field of view, when the third mapping relationship is configured, refer to FIG. 14. The image height of the image to be displayed on the display 103 may be adjusted until the field of view of the user whose visual acuity is 200 degrees changes to a. In this case, the image height is H3 mm in Table 5.

In a possible implementation, the processor 401 finds a corresponding first image height from a third mapping relationship based on the visual acuity of the user obtained in S604, and then may adjust an image height of a to-be-displayed image generated by the virtual camera to be the same as the first image height. Because the image height stored in the third mapping relationship is obtained by simulating different visual acuities, after the image to be displayed on the display 103 is adjusted based on the found image height, a field of view of the user is the same as a field of view of a user with another visual acuity.

For Example

Figure 15:
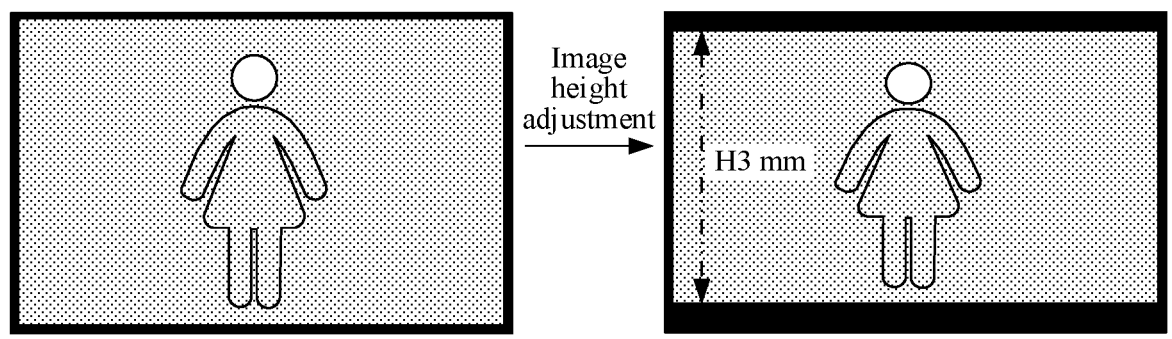
FIG. 15 is a schematic diagram 2 of adjusting an image height of a to-be-displayed image according to an embodiment of this application.

It is assumed that the visual acuity of the user obtained in S604 is 200 degrees. It may be found from the third mapping relationship that a corresponding image height is H3 mm. Refer to FIG. 15. The processor 401 may adjust an image height of an image shot by the virtual camera to H3 mm. When the image height is adjusted to H3 mm, fields of view of both a user whose visual acuity is 200 degrees and a user whose visual acuity is 0 degree when using the head-mounted display device 100 are α, thereby enhancing user experience.

In another possible implementation, the processor 401 finds a corresponding first image height from a third mapping relationship based on the visual acuity of the user obtained in S604, and then may perform conversion based on the image height to obtain a field of view adjustment amount of the virtual camera, and adjust a field of view parameter value of the virtual camera based on the field of view adjustment amount, so that an image height of a to-be-displayed image generated by the virtual camera is the same as the first image height.

For Example

It is assumed that the visual acuity of the user obtained in S604 is 200 degrees. In this case, it may be found from the third mapping relationship that a corresponding image height is H3 mm, and the field of view adjustment amount, obtained through conversion, of the virtual camera is x degrees. The field of view parameter value of the virtual camera may be adjusted based on the field of view adjustment amount. After the adjustment, the image height of the image generated by the virtual camera becomes H3 mm. Similarly, fields of view of both a user whose visual acuity is 200 degrees and a user whose visual acuity is 0 degree when using the head-mounted display device 100 are α, thereby enhancing user experience.

It should be noted that a sequence of S601 and S602 is not limited in this embodiment of this application. S601 may be performed before S602, or S602 may be performed before S601, or S601 and S602 may be performed at the same time. Similarly, a sequence of S603 and S604 is not limited in this embodiment of this application. S603 may be performed before S604, or S604 may be performed before S603, or S603 and S604 are performed at the same time. Similarly, a sequence of S605, S606, and S607 is not limited in this embodiment of this application. S605, S606, and S607 may be performed in any sequence. A sequence in FIG. 6 is merely an example.

According to the image calibration method provided in this embodiment of this application, after the pupil position offset of the user and the visual acuity of the user are detected, a corresponding image center point offset may be found from the first mapping relationship based on the pupil position offset of the user and the visual acuity of the user, and a center point of an image to be displayed on the display may be adjusted based on the image center point offset. In this way, a point seen by the user when the user looks straight ahead is the center point of the image displayed on the display, and after the foregoing calibration is performed on the optical systems on both sides, pictures seen by the two eyes of the user are the same, and the user does not feel dizzy. In addition, a corresponding distortion correction parameter is found from the second mapping relationship based on the pupil position offset of the user and the visual acuity of the user, and based on the distortion correction parameter, distortion correction is performed on the image to be displayed on the display. Because the distortion correction parameter stored in the second mapping relationship is obtained by simulating different eye offsets and different visual acuities, an effect of performing distortion correction based on the distortion correction parameter stored in the second mapping relationship is relatively ideal. In addition, a corresponding image height is found from the fourth mapping relationship based on the visual acuity of the user, and an image height of the image to be displayed on the display is adjusted based on the image height. In this way, users with different visual acuities can have a same field of view when using the head-mounted display device, thereby enhancing user experience.

Figure 16:
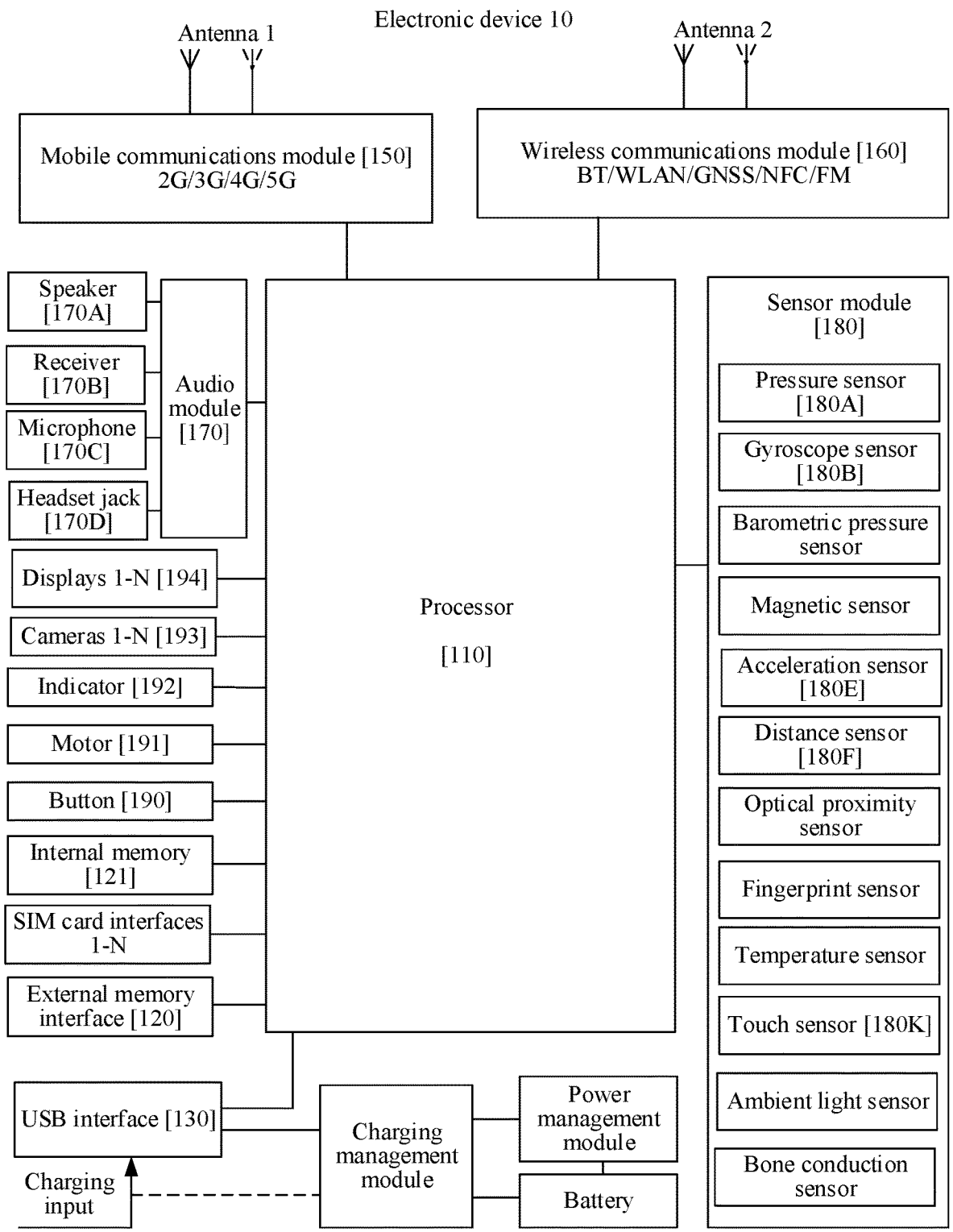
FIG. 16 is a schematic diagram of a structure of an electronic device 10.

FIG. 16 is a schematic diagram of a structure of an electronic device 10. The electronic device 10 may include a processor 110, an external memory interface 120, an internal memory 121, a universal serial bus (USB) interface 130, an antenna 1, an antenna 2, a mobile communications module 150, a wireless communications module 160, an audio module 170, a speaker 170A, a receiver 170B, a microphone 170C, a headset interface 170D, a sensor module 180, a button 190, a motor 191, an indicator 192, a camera 193, a display 194, and the like. The sensor module 180 may include a pressure sensor 180A, a gyroscope sensor 180B, an acceleration sensor 180E, a distance sensor 180F, a touch sensor 180K, and the like.

It may be understood that the structure shown in this embodiment of the present disclosure does not constitute a specific limitation on the electronic device 10. In some other embodiments of this application, the electronic device 10 may include more or fewer components than those shown in the figure, or have some components combined, or have some components split, or have a different component arrangement. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural network processing unit (NPU), and/or the like. Different processing units may be independent components, or may be integrated into one or more processors.

The controller may generate an operation control signal based on instruction operation code and a timing signal, to control instruction fetching and instruction execution.

A memory may be further disposed in the processor 110, to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, and reduces a waiting time of the processor 110, thereby improving system efficiency.

The processor 110 is configured to adjust, based on a pupil position offset of a user and a visual acuity of the user, a center point of an image to be displayed on the display 194. The processor is further configured to determine, based on the pupil position offset of the user and the visual acuity of the user, a distortion correction parameter corresponding to the image to be displayed on the display 194, and perform, based on the distortion correction parameter, distortion correction on the image to be displayed on the display 194. The processor is further configured to adjust, based on the visual acuity of the user, an image height of the image to be displayed on the display 194. After the foregoing image calibration, a virtual image seen by the user is not affected by an eye position shift, nor affected by an eye visual acuity. After the foregoing calibration is performed on two optical systems, pictures seen by two eyes of the user are the same, which improves user experience of using the electronic device 10.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, and includes a serial data line (SDA) and a serial clock line (SCL). In some embodiments, the processor 110 may include a plurality of groups of I2C buses. The processor 110 may be respectively coupled to the touch sensor 180K, a charger, a flash, a camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 10.

The I2S interface may be configured for audio communication. In some embodiments, the processor 110 may include a plurality of groups of I2S buses. The processor 110 may be coupled to the audio module 170 by using an I2S bus, to implement communication between the processor 110 and the audio module 170. In some embodiments, the audio module 170 may transfer an audio signal to the wireless communications module 160 through an I2S interface, to implement a function of answering a call by using a Bluetooth headset.

The PCM interface may also be configured for audio communication, to sample, quantize, and encode an analog signal. In some embodiments, the audio module 170 and the wireless communications module 160 may be coupled through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interfaces may be configured for audio communication.

The UART interface is a universal serial data bus, and is configured for asynchronous communication. The bus may be a bidirectional communications bus. It converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral device like the display 194 and the camera 193. The MIPI interface includes a camera serial interface (CSI), a display serial interface (DSI), and the like. In some embodiments, the processor 110 communicates with the camera 193 through the CSI interface, to implement a photographing function of the electronic device 10. The processor 110 communicates with the display 194 through the DSI interface, to implement a display function of the electronic device 10.

The GPIO interface may be configured by using software. The GPIO interface may be configured for a control signal or a data signal. In some embodiments, the GPIO interface may be configured to connect the processor 110 to the camera 193, the display 194, the wireless communications module 160, the audio module 170, the sensor module 180, and the like. The GPIO interface may be further configured as an I2C interface, an I2S interface, a UART interface, an MIPI interface, or the like.

The USB interface 130 is an interface that complies with a USB standard specification, and may be specifically a Mini USB interface, a Micro USB interface, a USB Type C interface, or the like. The USB interface 130 may be configured to connect to a charger to charge the electronic device 10, and may be configured to transmit data between the electronic device 10 and a peripheral device. The USB interface may also be configured to connect to a headset, to play audio by using the headset. The interface may be further configured to connect to another electronic device, for example, an AR device.

It may be understood that the schematic interfacing relationship between modules in this embodiment of the present disclosure is merely an example for description, and does not constitute a limitation on a structure of the electronic device 10. In some other embodiments of this application, the electronic device 10 may alternatively use an interfacing manner different from that in the foregoing embodiment, or use a combination of a plurality of interfacing manners.

A wireless communications function of the electronic device 10 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 10 may be configured to cover one or more communications bands. Different antennas may be multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a wireless communications solution that is applied to the electronic device 10 and that includes 2G/3G/4G/5G. The mobile communications module 150 may include at least one filter, switch, power amplifier, low noise amplifier (LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation by using the antenna 1. In some embodiments, at least some functional modules of the mobile communications module 150 may be disposed in the processor 110. In some embodiments, at least some functional modules in the mobile communications module 150 and at least some modules in the processor 110 may be disposed in a same component.

The modem processor may include a modulator and a demodulator. The modulator is configured to modulate a to-be-sent low-frequency baseband signal into an intermediate/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transferred to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communications module 150 or another functional module.

The wireless communications module 160 may provide a wireless communications solution that is applied to the electronic device 10 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communications module 160 may be one or more components integrating at least one communications processor module. The wireless communications module 160 receives an electromagnetic wave by using the antenna 2, performs frequency modulation and filtering on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 of the electronic device 10 is coupled to the mobile communications module 150, and the antenna 2 is coupled to the wireless communications module 160, so that the electronic device 10 may communicate with a network and another device by using a wireless communications technology. The wireless communications technology may include global system for mobile communications (GSM), general packet radio service (GPRS), code division multiple access (CDMA), wideband code division multiple access (WCDMA), time division-code division multiple access (TD-SCDMA), long term evolution (LTE), BT, GNSS, WLAN, NFC, FM, IR, and/or other technologies. The GNSS may include a global positioning system (GPS), a global navigation satellite system (GLONASS), a beidou navigation satellite system (BDS), a quasi-zenith satellite system (QZSS), and/or a satellite-based enhancement system (SBAS).

The electronic device 10 implements a display function by using the GPU, the display 194, the application processor, and the like. The GPU is a microprocessor for image processing, and is connected to the display 194 and the application processor. The GPU is configured to perform mathematical and geometric calculation for graphics rendering. The processor 110 may include one or more GPUs that execute program instructions to generate or change display information.

The display 194 is configured to display an image, a video, and the like. The display 194 includes a display panel. The display panel may use a liquid crystal display (LCD), an organic light-emitting diode (OLED), an active-matrix organic light-emitting diode (AMOLED), a flexible light-emitting diode (FLED), a mini-led, a micro-led, a micro-oLed, a quantum dot light-emitting diode (QLED), or the like. In some embodiments, the electronic device 10 may include one or N displays 194. N is a positive integer greater than 1.

The electronic device 10 may implement a photographing function by using the ISP, the camera 193, the video codec, the GPU, the display 194, the application processor, and the like.

The ISP is configured to process data fed back by the camera 193. For example, during photographing, when a shutter is opened, light is transferred to a photosensitive element of the camera through a lens, an optical signal is converted into an electrical signal, and the photosensitive element of the camera transfers the electrical signal to the ISP for processing, to convert the electrical signal into an image visible to a naked eye. The ISP may further optimize an algorithm for noise, brightness, and complexion of an image. The ISP may further optimize parameters such as an exposure and a color temperature of a photographed scene. In some embodiments, the ISP may be disposed in the camera 193.

The camera 193 is configured to capture a static image or a video. An optical image of an object is generated through the lens, and projected to the photosensitive element. The photosensitive element may be a charge-coupled device (CCD) or a complementary metal-oxide-semiconductor (CMOS) phototransistor. The photosensitive element converts the optical signal into an electrical signal, and then transfers the electrical signal to the ISP to convert the electrical signal into a digital image signal. The ISP outputs the digital image signal to the DSP for processing. The DSP converts the digital image signal into an image signal in a standard format like RGB or YUV. In some embodiments, the electronic device 10 may include one or N cameras 193. N is a positive integer greater than 1.

The digital signal processor is configured to process a digital signal. In addition to the digital image signal, the digital signal processor may further process another digital signal. For example, when the electronic device 10 selects a frequency, the digital signal processor is configured to perform Fourier transform or the like on frequency energy.

The video codec is configured to compress or decompress a digital video. The electronic device 10 may support one or more video codecs. In this way, the electronic device 10 may play or record videos in a plurality of encoding formats, for example, moving picture experts group (MPEG)1, MPEG2, MPEG3, and MPEG4.

The NPU is a neural-network (NN) computing processor, which quickly processes input information by referring to a biological neural network structure, for example, referring to a mode of transfer between human brain neurons, and may continuously perform self-learning. Applications such as intelligent cognition of the electronic device 10, for example, image recognition, facial recognition, speech recognition, and text understanding, may be implemented by using the NPU.

The external memory interface 120 may be configured to connect to an external memory card, for example, a microSD card, to expand a storage capability of the electronic device 10. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 10, and the like. In addition, the internal memory 121 may include a high-speed random access memory, and may further include a non-volatile memory, for example, at least one disk storage device, a flash memory device, or a universal flash storage (UFS). The processor 110 executes various function applications and data processing of the electronic device 10 by running the instructions stored in the internal memory 121 and/or the instructions stored in the memory disposed in the processor.

The electronic device 10 may implement an audio function, for example, music playing or recording, by using the audio module 170, the speaker 170A, the receiver 170B, the microphone 170C, the headset interface 170D, the application processor, and the like.

The audio module 170 is configured to convert digital audio information into an analog audio signal for output, and convert an analog audio input into a digital audio signal. The audio module 170 may be further configured to encode and decode audio signals. In some embodiments, the audio module 170 may be disposed in the processor 110, or some functional modules of the audio module 170 are disposed in the processor 110.

The speaker 170A, also referred to as a "loudspeaker", is configured to convert an electrical audio signal into a sound signal. With the electronic device 10, the user may listen to music or listen to a hands-free call by using the speaker 170A.

The receiver 170B, also referred to as a "phone receiver", is configured to convert an electrical audio signal into a sound signal. With the electronic device 10, when the user answers a call or receives a voice message, the receiver 170B may be placed close to a human ear to listen to a voice.

The microphone 170C, also referred to as a "mic" or a "sound transmitter", is configured to convert a sound signal into an electrical signal. When making a call or sending a voice message, the user may make a voice with the mouth near the microphone 170C, so that a sound signal is input to the microphone 170C. At least one microphone 170C may be disposed in the electronic device 10. In some other embodiments, two microphones 170C may be disposed in the electronic device 10, to collect a sound signal and implement a noise reduction function. In some other embodiments, alternatively, three, four, or more microphones 170C may be disposed in the electronic device 10, to collect a sound signal, reduce noise, recognize a sound source to implement a directional sound recording function, and the like.

The headset interface 170D is configured to connect to a wired headset. The headset interface 170D may be a USB interface 130, or may be a 3.5 mm open mobile terminal platform (OMTP) standard interface or a US cellular telecommunications industry association (CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates having a conductive material. When a force is applied to the pressure sensor 180A, capacitance between electrodes changes. The electronic device 10 determines pressure intensity based on the change of the capacitance. When a touch operation is applied to the display 194, the electronic device detects touch operation intensity based on the pressure sensor 180A. The electronic device may also calculate a touch position based on a signal detected by the pressure sensor 180A. In some embodiments, touch operations that are applied to a same touch position but have different touch operation intensity may correspond to different operation instructions. For example, when a touch operation with touch operation intensity less than a first pressure threshold is applied to an SMS message application icon, an instruction for viewing an SMS message is executed. When a touch operation with touch operation intensity greater than or equal to the first pressure threshold is applied to the SMS message application icon, an instruction for creating a new SMS message is executed.

The gyroscope sensor 180B may be configured to determine a motion posture of the electronic device 10. In some embodiments, angular velocities of the electronic device 10 around three axes (namely, x, y, and z axes) may be determined by using the gyroscope sensor 180B. The gyroscope sensor 180B may be configured for image stabilization during photographing. For example, when the shutter is pressed, the gyroscope sensor 180B detects an angle at which the electronic device 10 jitters, and calculates, based on the angle, a distance for which a lens module needs to compensate, so that a lens offsets the jitter of the electronic device 10 through reverse motion, to implement image stabilization. The gyroscope sensor 180B may be further used in navigation and motion sensing game scenarios.

The acceleration sensor 180E may detect magnitude of accelerations in different directions (generally on three axes) of the electronic device 10, may detect a magnitude and a direction of gravity when the electronic device 10 is stationary, and may be further configured to recognize a posture of the electronic device, which is applied to landscape-portrait switching, a pedometer, or other applications.

The distance sensor 180F is configured to measure a distance. The electronic device 10 may measure the distance by using infrared or laser light. In some embodiments, for a photographed scene, the electronic device 10 may measure a distance by using the distance sensor 180F, to implement fast focusing.

The touch sensor 180K is also referred to as a "touch component". The touch sensor 180K may be disposed on the display 194. The touch sensor 180K and the display 194 constitute a touchscreen, which is also referred to as a "touch control screen". The touch sensor 180K is configured to detect a touch operation performed on or near the touch sensor. The touch sensor may transfer the detected touch operation to the application processor to determine a touch event type. A visual output related to the touch operation may be provided by using the display 194. In some other embodiments, the touch sensor 180K may alternatively be disposed on a surface of the electronic device 10 and at a position different from that of the display 194.

The button 190 includes a power button, a volume button, and the like. The button 190 may be a mechanical button, or may be a touch button. The electronic device 10 may receive a button input, generate a button signal input that is related to user setting and function control of the electronic device 10.

The motor 191 may generate a vibration prompt. The motor 191 may be configured to generate an incoming call vibration prompt and a touch vibration feedback. For example, touch operations applied to different applications (for example, photographing and audio playing) may correspond to different vibration feedback effects. The motor 191 may also generate different vibration feedback effects corresponding to touch operations applied to different areas of the display 194. Different application scenarios (for example, a time reminder, information receiving, an alarm clock, and a game) may also correspond to different vibration feedback effects. The touch vibration feedback effect may also be customized.

The indicator 192 may be an indicator light, and may be configured to indicate a charging status and a battery level change, and may also be configured to indicate a message, a missed call, a notification, and the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image calibration method, comprising:
obtaining a pupil position offset of a user and a visual acuity of the user, wherein the pupil position offset of the user is an offset of a pupil of the user relative to an optical axis;
determining, based on the pupil position offset of the user and the visual acuity of the user, a first distortion correction parameter corresponding to the pupil position offset of the user and the visual acuity of the user; and
correcting a position of each pixel on a to-be-displayed image based on the first distortion correction parameter;
wherein the first distortion correction parameter comprises a distortion correction parameter corresponding to a red subpixel, a distortion correction parameter corresponding to a green subpixel, and a distortion correction parameter corresponding to a blue subpixel; and
wherein the correcting the position of each pixel on the to-be-displayed image based on the first distortion correction parameter comprises:
correcting a position of each red subpixel on the to-be-displayed image based on the distortion correction parameter corresponding to the red subpixel;
correcting a position of each green subpixel on the to-be-displayed image based on the distortion correction parameter corresponding to the green subpixel; and
correcting a position of each blue subpixel on the to-be-displayed image based on the distortion correction parameter corresponding to the blue subpixel.

2. The method according to claim 1, further comprising:
determining, based on the pupil position offset of the user and the visual acuity of the user, a first image center point offset corresponding to the pupil position offset of the user and the visual acuity of the user; and
adjusting a center point of the to-be-displayed image based on the first image center point offset and a pupil shift direction.

3. The method according to claim 2, wherein the determining, based on the pupil position offset of the user and the visual acuity of the user, the first image center point offset corresponding to the pupil position offset of the user and the visual acuity of the user comprises:
determining the first image center point offset based on the pupil position offset of the user, the visual acuity of the user, and a first mapping relationship, wherein the first mapping relationship indicates a correspondence between a pupil position offset, a visual acuity, and an image center point offset.

4. The method according to claim 2, wherein the adjusting the center point of the to-be-displayed image based on the first image center point offset and the pupil shift direction comprises:
moving the center point of the to-be-displayed image toward the pupil shift direction by a first distance, wherein the first distance is the same as the first image center point offset, and scene data is configured to be rendered according to an instruction input by the user or a default playing order to generate a corresponding image.

5. The method according to claim 2, wherein the adjusting the center point of the to-be-displayed image based on the first image center point offset and the pupil shift direction comprises:
adjusting a displacement parameter value based on the first image center point offset, so that the center point of the to-be-displayed image is moved toward the pupil shift direction by a first distance, wherein the first distance is the same as the first image center point offset, and scene data is configured to be rendered according to an instruction input by the user or a default playing order to generate a corresponding image.

6. The method according to claim 1, wherein the determining, based on the pupil position offset of the user and the visual acuity of the user, the first distortion correction parameter corresponding to the pupil position offset of the user and the visual acuity of the user comprises:
determining the first distortion correction parameter based on the pupil position offset of the user, the visual acuity of the user, and a second mapping relationship, wherein the second mapping relationship indicates a correspondence between a pupil position offset, a visual acuity, and a distortion correction parameter.

7. An electronic device, comprising:
a camera configured to shoot an eye image; and
a processor configured to:
obtain a pupil position offset of a user and a visual acuity of the user in the eye image, wherein the pupil position offset of the user is an offset of a pupil of the user relative to an optical axis;
determine, based on the pupil position offset of the user and the visual acuity of the user, a first distortion correction parameter corresponding to the pupil position offset of the user and the visual acuity of the user; and
correct a position of each pixel on a to-be-displayed image based on the first distortion correction parameter;
wherein the first distortion correction parameter comprises a distortion correction parameter corresponding to a red subpixel, a distortion correction parameter corresponding to a green subpixel, and a distortion correction parameter corresponding to a blue subpixel; and
wherein the correcting the position of each pixel on the to-be-displayed image based on the first distortion correction parameter comprises:
correcting a position of each red subpixel on the to-be-displayed image based on the distortion correction parameter corresponding to the red subpixel;
correcting a position of each green subpixel on the to-be-displayed image based on the distortion correction parameter corresponding to the green subpixel; and
correcting a position of each blue subpixel on the to-be-displayed image based on the distortion correction parameter corresponding to the blue subpixel.

8. The electronic device according to claim 7, wherein the processor is further configured to:
determine, based on the pupil position offset of the user and the visual acuity of the user, a first image center point offset corresponding to the pupil position offset of the user and the visual acuity of the user; and
adjust a center point of the to-be-displayed image based on the first image center point offset and a pupil shift direction.

9. The electronic device according to claim 8, wherein the determining, based on the pupil position offset of the user and the visual acuity of the user, the first image center point offset corresponding to the pupil position offset of the user and the visual acuity of the user comprises:

determining the first image center point offset based on the pupil position offset of the user, the visual acuity of the user, and a first mapping relationship, wherein the first mapping relationship indicates a correspondence between a pupil position offset, a visual acuity, and an image center point offset.

10. The electronic device according to claim 8, wherein the adjusting the center point of the to-be-displayed image based on the first image center point offset and the pupil shift direction comprises:

moving the center point of the to-be-displayed image toward the pupil shift direction by a first distance, wherein the first distance is the same as the first image center point offset, and scene data is configured to be rendered according to an instruction input by the user or a default playing order to generate a corresponding image.

11. The electronic device according to claim 8, wherein the adjusting the center point of the to-be-displayed image based on the first image center point offset and the pupil shift direction comprises:

adjusting a displacement parameter value based on the first image center point offset, so that the center point of the to-be-displayed image is moved toward the pupil shift direction by a first distance, wherein the first distance is the same as the first image center point offset, and scene data is configured to be rendered according to an instruction input by the user or a default playing order to generate a corresponding image.

12. The electronic device according to claim 7, wherein the determining, based on the pupil position offset of the user and the visual acuity of the user, the first distortion correction parameter corresponding to the pupil position offset of the user and the visual acuity of the user comprises:

determining the first distortion correction parameter based on the pupil position offset of the user, the visual acuity of the user, and a second mapping relationship, wherein the second mapping relationship indicates a correspondence between a pupil position offset, a visual acuity, and a distortion correction parameter.

13. A non-transitory computer-readable storage medium storing a computer program that, when executed by a processor, causes a computer to perform operations comprising:

obtaining a pupil position offset of a user and a visual acuity of the user, wherein the pupil position offset of the user is an offset of a pupil of the user relative to an optical axis;

determining, based on the pupil position offset of the user and the visual acuity of the user, a first distortion correction parameter corresponding to the pupil position offset of the user and the visual acuity of the user; and correcting a position of each pixel on a to-be-displayed image based on the first distortion correction parameter;

wherein the first distortion correction parameter comprises a distortion correction parameter corresponding to a red subpixel, a distortion correction parameter corresponding to a green subpixel, and a distortion correction parameter corresponding to a blue subpixel; and wherein the correcting the position of each pixel on the to-be-displayed image based on the first distortion correction parameter comprises:

correcting a position of each red subpixel on the to-be-displayed image based on the distortion correction parameter corresponding to the red subpixel;

correcting a position of each green subpixel on the to-be-displayed image based on the distortion correction parameter corresponding to the green subpixel; and correcting a position of each blue subpixel on the to-be-displayed image based on the distortion correction parameter corresponding to the blue subpixel.

14. The computer-readable storage medium according to claim 13, wherein the determining, based on the pupil position offset of the user and the visual acuity of the user, the first distortion correction parameter corresponding to the pupil position offset of the user and the visual acuity of the user comprises:

determining the first distortion correction parameter based on the pupil position offset of the user, the visual acuity of the user, and a second mapping relationship, wherein the second mapping relationship indicates a correspondence between a pupil position offset, a visual acuity, and a distortion correction parameter.

15. The computer-readable storage medium according to claim 13, the operations further comprising:

determining, based on the pupil position offset of the user and the visual acuity of the user, a first image center point offset corresponding to the pupil position offset of the user and the visual acuity of the user; and adjusting a center point of the to-be-displayed image based on the first image center point offset and a pupil shift direction.

16. The computer-readable storage medium according to claim 15, wherein the determining, based on the pupil position offset of the user and the visual acuity of the user, the first image center point offset corresponding to the pupil position offset of the user and the visual acuity of the user comprises:

determining the first image center point offset based on the pupil position offset of the user, the visual acuity of the user, and a first mapping relationship, wherein the first mapping relationship indicates a correspondence between a pupil position offset, a visual acuity, and an image center point offset.

17. The computer-readable storage medium according to claim 15, wherein the adjusting the center point of the to-be-displayed image based on the first image center point offset and the pupil shift direction comprises:

moving the center point of the to-be-displayed image toward the pupil shift direction by a first distance, wherein the first distance is the same as the first image center point offset, and scene data is configured to be rendered according to an instruction input by the user or a default playing order to generate a corresponding image.

18. The computer-readable storage medium according to claim 15, wherein the adjusting the center point of the to-be-displayed image based on the first image center point offset and the pupil shift direction comprises:

adjusting a displacement parameter value based on the first image center point offset, so that the center point of the to-be-displayed image is moved toward the pupil shift direction by a first distance, wherein the first distance is the same as the first image center point offset, and scene data is configured to be rendered according to an instruction input by the user or a default playing order to generate a corresponding image.

\* \* \* \* \*